(12) United States Patent
Smith et al.

(10) Patent No.: US 9,195,636 B2
(45) Date of Patent: Nov. 24, 2015

(54) UNIVERSAL FILE TYPE PREVIEW FOR MOBILE DEVICES

(75) Inventors: Michael Smith, Palo Alto, CA (US); Jeffrey H. Seibert, Jr., Cambridge, MA (US); Nicholas Silva, Mountain View, CA (US)

(73) Assignee: Box, Inc., Los Altos, CA (US)

( * ) Notice: Subject to any disclaimer, the term of this patent is extended or adjusted under 35 U.S.C. 154(b) by 791 days.

(21) Appl. No.: 13/414,480

(22) Filed: Mar. 7, 2012

(65) Prior Publication Data

US 2013/0238969 A1 Sep. 12, 2013

(51) Int. Cl.
| | |
|---|---|
| G06F 17/00 | (2006.01) |
| G06F 17/21 | (2006.01) |
| G06F 17/22 | (2006.01) |
| G06F 17/30 | (2006.01) |

(52) U.S. Cl.
CPC .......... *G06F 17/212* (2013.01); *G06F 17/2229* (2013.01); *G06F 17/30905* (2013.01)

(58) Field of Classification Search
None
See application file for complete search history.

(56) References Cited

U.S. PATENT DOCUMENTS

| | | |
|---|---|---|
| 5,787,175 A | 7/1998 | Carter |
| 5,799,320 A | 8/1998 | Klug |
| 5,848,415 A | 12/1998 | Guck |
| 5,864,870 A | 1/1999 | Guck |
| 5,999,908 A | 12/1999 | Abelow |
| 6,016,467 A | 1/2000 | Newsted et al. |
| 6,034,621 A | 3/2000 | Kaufman |
| 6,055,543 A | 4/2000 | Christensen et al. |
| 6,073,161 A | 6/2000 | DeBoskey et al. |
| 6,098,078 A | 8/2000 | Gehani et al. |
| 6,233,600 B1 | 5/2001 | Salas et al. |
| 6,260,040 B1 | 7/2001 | Kauffman et al. |
| 6,289,345 B1 | 9/2001 | Yasue |
| 6,292,803 B1 | 9/2001 | Richardson et al. |
| 6,336,124 B1 | 1/2002 | Alam et al. |

(Continued)

FOREIGN PATENT DOCUMENTS

| | | |
|---|---|---|
| CA | 2724521 | 11/2009 |
| CN | 101997924 A | 3/2011 |

(Continued)

OTHER PUBLICATIONS

"Average Conversion Time for a D60 RAW file?" http://www.dpreview.com, Jul. 22, 2002, 4 pages.

(Continued)

*Primary Examiner* — Scott Baderman
*Assistant Examiner* — Asher Kells
(74) *Attorney, Agent, or Firm* — Perkins Coie LLP

(57) ABSTRACT

Systems and methods for providing previews to mobile client devices of files stored in a web-based collaboration platform are disclosed. In one embodiment, a system sends a request to preview a file uploaded to the web-based collaboration platform. The system receives preview information for accessing and manipulating preview of the uploaded file. The preview information includes a scheme for accessing file segments of the preview of the uploaded file. The file segments are byproducts of a conversion of the file from the source format to a target format and have a requested preview format. The system further includes a viewer to access the file segments of the uploaded file using the scheme. The viewer displays the accessed file segments on a touch screen responsive to swiping actions on the touch screen, the swiping actions determined based on the source format.

26 Claims, 14 Drawing Sheets

Capabilities Decoding 433

| Source Format | Coding | Swiping Action | Instruction |
|---|---|---|---|
| MicroSoft Word | 0 | Single Touch (click) | Place cursor at touched location for editing |
| | | Double Touch (click) | Select double clicked word |
| | | Swipe Right-to-Left (when word selected) | Delete selected word |
| | | ⋮ | |
| MicroSoft PowerPoint | 1 | Single Touch (click) | Place cursor at touched location for editing |
| | | Double Touch (click) | Zoom In |
| | | Swipe Right-to-Left | Next Slide |
| | | ⋮ | |
| Abobe PhotoShop | 2 | | |
| ⋮ | | | |

(56) References Cited

U.S. PATENT DOCUMENTS

| | | | |
|---|---|---|---|
| 6,342,906 B1 | 1/2002 | Kumar et al. |
| 6,345,386 B1 | 2/2002 | Delo et al. |
| 6,370,543 B2 | 4/2002 | Hoffert et al. |
| 6,374,260 B1 | 4/2002 | Hoffert et al. |
| 6,385,606 B2 | 5/2002 | Inohara et al. |
| 6,396,593 B1 | 5/2002 | Laverty et al. |
| 6,515,681 B1 | 2/2003 | Knight |
| 6,539,381 B1 | 3/2003 | Prasad et al. |
| 6,584,466 B1 | 6/2003 | Serbinis et al. |
| 6,636,872 B1 | 10/2003 | Heath et al. |
| 6,654,737 B1 | 11/2003 | Nunez |
| 6,662,186 B1 | 12/2003 | Esquibel et al. |
| 6,687,878 B1 | 2/2004 | Eintracht et al. |
| 6,714,968 B1 | 3/2004 | Prust |
| 6,735,623 B1 | 5/2004 | Prust |
| 6,742,181 B1 | 5/2004 | Koike et al. |
| 6,760,721 B1 | 7/2004 | Chasen et al. |
| 6,947,162 B2 | 9/2005 | Rosenberg et al. |
| 6,952,724 B2 | 10/2005 | Prust |
| 6,996,768 B1 | 2/2006 | Elo et al. |
| 7,010,752 B2 | 3/2006 | Ly |
| 7,020,697 B1 | 3/2006 | Goodman et al. |
| 7,039,806 B1 | 5/2006 | Friedman et al. |
| 7,069,393 B2 | 6/2006 | Miyata et al. |
| 7,130,831 B2 | 10/2006 | Howard et al. |
| 7,133,834 B1 | 11/2006 | Abelow |
| 7,149,787 B1 | 12/2006 | Mutalik et al. |
| 7,152,182 B2 | 12/2006 | Ji et al. |
| 7,155,483 B1 | 12/2006 | Friend et al. |
| 7,165,107 B2 | 1/2007 | Pouyoul et al. |
| 7,222,078 B2 | 5/2007 | Abelow |
| 7,275,244 B1 | 9/2007 | Charles Bell et al. |
| 7,296,025 B2 | 11/2007 | Kung et al. |
| 7,346,778 B1 | 3/2008 | Guiter et al. |
| 7,353,252 B1 | 4/2008 | Yang et al. |
| 7,370,269 B1 | 5/2008 | Prabhu et al. |
| 7,386,535 B1 | 6/2008 | Kalucha et al. |
| 7,401,117 B2 | 7/2008 | Dan et al. |
| 7,543,000 B2 | 6/2009 | Castro et al. |
| 7,581,221 B2 | 8/2009 | Lai et al. |
| 7,620,565 B1 | 11/2009 | Abelow |
| 7,647,559 B2 | 1/2010 | Yozell-Epstein et al. |
| 7,650,367 B2 | 1/2010 | Arruza |
| 7,661,088 B2 | 2/2010 | Burke |
| 7,665,093 B2 | 2/2010 | Maybee et al. |
| 7,676,542 B2 | 3/2010 | Moser et al. |
| 7,698,363 B2 | 4/2010 | Dan et al. |
| 7,734,600 B1 | 6/2010 | Wise et al. |
| 7,756,843 B1 | 7/2010 | Palmer |
| 7,774,412 B1 | 8/2010 | Schnepel |
| 7,814,426 B2 | 10/2010 | Huesken et al. |
| 7,886,287 B1 | 2/2011 | Davda |
| 7,890,964 B2 | 2/2011 | Vogler-Ivashchanka et al. |
| 7,937,663 B2 | 5/2011 | Parker et al. |
| 7,958,353 B2 | 6/2011 | Matsuzaki et al. |
| 7,958,453 B1 | 6/2011 | Taing |
| 7,979,296 B2 | 7/2011 | Kruse et al. |
| 7,996,374 B1 | 8/2011 | Jones et al. |
| 8,027,976 B1 | 9/2011 | Ding et al. |
| RE42,904 E | 11/2011 | Stephens, Jr. |
| 8,065,739 B1 | 11/2011 | Bruening et al. |
| 8,090,361 B2 | 1/2012 | Hagan |
| 8,103,662 B2 | 1/2012 | Eagan et al. |
| 8,117,261 B2 | 2/2012 | Briere et al. |
| 8,140,513 B2 | 3/2012 | Ghods et al. |
| 8,151,183 B2 | 4/2012 | Chen et al. |
| 8,185,830 B2 | 5/2012 | Saha et al. |
| 8,200,582 B2 | 6/2012 | Zhu |
| 8,214,747 B1 | 7/2012 | Yankovich et al. |
| 8,230,348 B2 | 7/2012 | Peters et al. |
| 8,239,918 B1 | 8/2012 | Cohen |
| 8,326,814 B2 | 12/2012 | Ghods et al. |
| 8,347,276 B2 | 1/2013 | Schadow |
| 8,358,701 B2 | 1/2013 | Chou et al. |
| 8,370,803 B1 | 2/2013 | Holler et al. |
| 8,429,540 B1 | 4/2013 | Yankovich et al. |
| 8,464,161 B2 | 6/2013 | Giles et al. |
| 8,515,902 B2 | 8/2013 | Savage |
| 8,527,549 B2 | 9/2013 | Cidon |
| 8,549,066 B1 | 10/2013 | Donahue et al. |
| 8,549,511 B2 | 10/2013 | Seki et al. |
| 8,583,619 B2 | 11/2013 | Ghods et al. |
| 8,607,306 B1 | 12/2013 | Bridge et al. |
| 8,719,445 B2 | 5/2014 | Ko |
| 8,745,267 B2 | 6/2014 | Luecke et al. |
| 8,849,955 B2 | 9/2014 | Prahlad et al. |
| 8,868,574 B2 | 10/2014 | Kiang et al. |
| 8,892,679 B1 | 11/2014 | Destagnol et al. |
| 8,914,900 B2 | 12/2014 | Smith et al. |
| 8,959,579 B2 | 2/2015 | Barton et al. |
| 2001/0027492 A1 | 10/2001 | Gupta |
| 2002/0029218 A1 | 3/2002 | Bentley et al. |
| 2002/0091738 A1 | 7/2002 | Rohrabaugh et al. |
| 2002/0099772 A1 | 7/2002 | Deshpande et al. |
| 2002/0133509 A1 | 9/2002 | Johnston et al. |
| 2002/0147770 A1 | 10/2002 | Tang |
| 2002/0194177 A1 | 12/2002 | Sherman et al. |
| 2003/0041095 A1 | 2/2003 | Konda et al. |
| 2003/0084306 A1 | 5/2003 | Abburi et al. |
| 2003/0093404 A1 | 5/2003 | Bader et al. |
| 2003/0108052 A1 | 6/2003 | Inoue et al. |
| 2003/0110264 A1 | 6/2003 | Whidby et al. |
| 2003/0115326 A1 | 6/2003 | Verma et al. |
| 2003/0135536 A1 | 7/2003 | Lyons |
| 2003/0135565 A1 | 7/2003 | Estrada |
| 2003/0154306 A1 | 8/2003 | Perry |
| 2003/0204490 A1 | 10/2003 | Kasriel |
| 2003/0217171 A1 | 11/2003 | Von Stuermer et al. |
| 2004/0021686 A1 | 2/2004 | Barberis |
| 2004/0088647 A1 | 5/2004 | Miller et al. |
| 2004/0103147 A1 | 5/2004 | Flesher et al. |
| 2004/0111415 A1 | 6/2004 | Scardino et al. |
| 2004/0117438 A1 | 6/2004 | Considine et al. |
| 2004/0122949 A1 | 6/2004 | Zmudzinski et al. |
| 2004/0128359 A1 | 7/2004 | Horvitz et al. |
| 2004/0177138 A1 | 9/2004 | Salle et al. |
| 2004/0181579 A1 | 9/2004 | Huck et al. |
| 2004/0196307 A1 | 10/2004 | Zak et al. |
| 2004/0201604 A1 | 10/2004 | Kraenzel et al. |
| 2004/0230624 A1 | 11/2004 | Frolund et al. |
| 2004/0246532 A1 | 12/2004 | Inada |
| 2004/0267836 A1 | 12/2004 | Armangau et al. |
| 2005/0005276 A1 | 1/2005 | Morgan |
| 2005/0010860 A1 | 1/2005 | Weiss et al. |
| 2005/0022229 A1 | 1/2005 | Gabriel et al. |
| 2005/0028006 A1 | 2/2005 | Leser et al. |
| 2005/0050228 A1 | 3/2005 | Perham et al. |
| 2005/0063083 A1 | 3/2005 | Dart et al. |
| 2005/0097225 A1 | 5/2005 | Glatt et al. |
| 2005/0102328 A1 | 5/2005 | Ring et al. |
| 2005/0108406 A1 | 5/2005 | Lee et al. |
| 2005/0114305 A1 | 5/2005 | Haynes et al. |
| 2005/0114378 A1 | 5/2005 | Elien et al. |
| 2005/0138118 A1 | 6/2005 | Banatwala et al. |
| 2005/0182966 A1 | 8/2005 | Pham et al. |
| 2005/0198299 A1 | 9/2005 | Beck et al. |
| 2005/0198452 A1 | 9/2005 | Watanabe |
| 2005/0234864 A1 | 10/2005 | Shapiro |
| 2005/0234943 A1 | 10/2005 | Clarke |
| 2005/0261933 A1 | 11/2005 | Magnuson |
| 2006/0005163 A1 | 1/2006 | Huesken et al. |
| 2006/0026502 A1 | 2/2006 | Dutta |
| 2006/0026535 A1 | 2/2006 | Hotelling et al. |
| 2006/0036568 A1 | 2/2006 | Moore et al. |
| 2006/0041603 A1 | 2/2006 | Paterson et al. |
| 2006/0047804 A1 | 3/2006 | Fredricksen et al. |
| 2006/0053088 A1 | 3/2006 | Ali et al. |
| 2006/0053380 A1 | 3/2006 | Spataro et al. |
| 2006/0070083 A1 | 3/2006 | Brunswig et al. |
| 2006/0075071 A1 | 4/2006 | Gillette |
| 2006/0117247 A1 | 6/2006 | Fite et al. |
| 2006/0123062 A1 | 6/2006 | Bobbitt et al. |
| 2006/0133340 A1 | 6/2006 | Rybak et al. |
| 2006/0168550 A1 | 7/2006 | Muller et al. |

(56) References Cited

U.S. PATENT DOCUMENTS

| | | |
|---|---|---|
| 2006/0174051 A1 | 8/2006 | Lordi et al. |
| 2006/0174054 A1 | 8/2006 | Matsuki |
| 2006/0179070 A1 | 8/2006 | George et al. |
| 2006/0242204 A1 | 10/2006 | Karas et al. |
| 2006/0259524 A1 | 11/2006 | Horton |
| 2006/0265719 A1 | 11/2006 | Astl et al. |
| 2006/0271510 A1 | 11/2006 | Harward et al. |
| 2007/0016680 A1 | 1/2007 | Burd et al. |
| 2007/0038934 A1 | 2/2007 | Fellman |
| 2007/0079242 A1 | 4/2007 | Jolley et al. |
| 2007/0100830 A1 | 5/2007 | Beedubail et al. |
| 2007/0115845 A1 | 5/2007 | Hochwarth et al. |
| 2007/0118598 A1 | 5/2007 | Bedi et al. |
| 2007/0124460 A1 | 5/2007 | McMullen et al. |
| 2007/0124737 A1 | 5/2007 | Wensley et al. |
| 2007/0124781 A1 | 5/2007 | Casey et al. |
| 2007/0126635 A1 | 6/2007 | Houri |
| 2007/0130143 A1 | 6/2007 | Zhang et al. |
| 2007/0130163 A1 | 6/2007 | Perez et al. |
| 2007/0198609 A1 | 8/2007 | Black et al. |
| 2007/0208878 A1 | 9/2007 | Barnes-Leon et al. |
| 2007/0214180 A1 | 9/2007 | Crawford |
| 2007/0220016 A1 | 9/2007 | Estrada et al. |
| 2007/0220590 A1 | 9/2007 | Rasmussen et al. |
| 2007/0240057 A1 | 10/2007 | Satterfield et al. |
| 2007/0250762 A1* | 10/2007 | Mansfield ............... 715/501.1 |
| 2007/0256065 A1 | 11/2007 | Heishi et al. |
| 2007/0266304 A1 | 11/2007 | Fletcher et al. |
| 2007/0282848 A1 | 12/2007 | Kiilerich et al. |
| 2007/0283443 A1 | 12/2007 | McPherson et al. |
| 2007/0288290 A1 | 12/2007 | Motoyama et al. |
| 2008/0005135 A1 | 1/2008 | Muthukrishnan et al. |
| 2008/0005195 A1 | 1/2008 | Li |
| 2008/0016146 A1 | 1/2008 | Gan et al. |
| 2008/0021959 A1 | 1/2008 | Naghi et al. |
| 2008/0028323 A1 | 1/2008 | Rosen et al. |
| 2008/0040173 A1 | 2/2008 | Aleong et al. |
| 2008/0040503 A1* | 2/2008 | Kleks et al. ............... 709/236 |
| 2008/0046828 A1 | 2/2008 | Bibliowicz et al. |
| 2008/0059656 A1 | 3/2008 | Saliba et al. |
| 2008/0063210 A1 | 3/2008 | Goodman et al. |
| 2008/0065881 A1 | 3/2008 | Dawson et al. |
| 2008/0077631 A1 | 3/2008 | Petri |
| 2008/0091763 A1 | 4/2008 | Devonshire et al. |
| 2008/0091790 A1 | 4/2008 | Beck |
| 2008/0104277 A1 | 5/2008 | Tian |
| 2008/0114720 A1 | 5/2008 | Smith et al. |
| 2008/0133674 A1 | 6/2008 | Knauerhase et al. |
| 2008/0140732 A1 | 6/2008 | Wilson et al. |
| 2008/0147790 A1 | 6/2008 | Malaney et al. |
| 2008/0151817 A1 | 6/2008 | Fitchett et al. |
| 2008/0154873 A1 | 6/2008 | Redlich et al. |
| 2008/0182628 A1 | 7/2008 | Lee et al. |
| 2008/0183467 A1 | 7/2008 | Yuan et al. |
| 2008/0184130 A1 | 7/2008 | Tien et al. |
| 2008/0194239 A1 | 8/2008 | Hagan |
| 2008/0215883 A1 | 9/2008 | Fok et al. |
| 2008/0222654 A1 | 9/2008 | Xu et al. |
| 2008/0243855 A1 | 10/2008 | Prahlad et al. |
| 2008/0250333 A1 | 10/2008 | Reeves et al. |
| 2008/0250348 A1 | 10/2008 | Alimpich et al. |
| 2008/0263099 A1 | 10/2008 | Brady-Kalnay et al. |
| 2008/0271095 A1 | 10/2008 | Shafton |
| 2008/0276158 A1 | 11/2008 | Lim et al. |
| 2008/0294899 A1 | 11/2008 | Gazzetta et al. |
| 2009/0015864 A1 | 1/2009 | Hasegawa |
| 2009/0019093 A1 | 1/2009 | Brodersen et al. |
| 2009/0019426 A1 | 1/2009 | Baeumer et al. |
| 2009/0030710 A1 | 1/2009 | Levine |
| 2009/0044128 A1 | 2/2009 | Baumgarten et al. |
| 2009/0049131 A1 | 2/2009 | Lyle et al. |
| 2009/0119322 A1* | 5/2009 | Mills et al. ............... 707/101 |
| 2009/0125469 A1 | 5/2009 | McDonald et al. |
| 2009/0132651 A1 | 5/2009 | Roger et al. |
| 2009/0138808 A1 | 5/2009 | Moromisato et al. |
| 2009/0150417 A1 | 6/2009 | Ghods et al. |
| 2009/0150627 A1 | 6/2009 | Benhase et al. |
| 2009/0158142 A1 | 6/2009 | Arthursson et al. |
| 2009/0164438 A1 | 6/2009 | Delacruz |
| 2009/0171983 A1 | 7/2009 | Samji et al. |
| 2009/0193107 A1 | 7/2009 | Srinivasan et al. |
| 2009/0193345 A1 | 7/2009 | Wensley et al. |
| 2009/0198772 A1 | 8/2009 | Kim et al. |
| 2009/0210459 A1 | 8/2009 | Nair et al. |
| 2009/0214115 A1 | 8/2009 | Kimura et al. |
| 2009/0235167 A1 | 9/2009 | Boyer et al. |
| 2009/0235181 A1 | 9/2009 | Saliba et al. |
| 2009/0235189 A1 | 9/2009 | Aybes et al. |
| 2009/0249224 A1 | 10/2009 | Davis et al. |
| 2009/0254589 A1 | 10/2009 | Nair et al. |
| 2009/0260060 A1 | 10/2009 | Smith et al. |
| 2009/0265430 A1 | 10/2009 | Bechtel et al. |
| 2009/0271708 A1 | 10/2009 | Peters et al. |
| 2009/0276771 A1 | 11/2009 | Nickolov et al. |
| 2009/0282212 A1 | 11/2009 | Peterson |
| 2009/0300356 A1 | 12/2009 | Crandell |
| 2009/0300527 A1 | 12/2009 | Malcolm et al. |
| 2009/0327358 A1 | 12/2009 | Lukiyanov et al. |
| 2009/0327961 A1 | 12/2009 | De Vorchik et al. |
| 2010/0011292 A1 | 1/2010 | Marinkovich et al. |
| 2010/0011447 A1 | 1/2010 | Jothimani |
| 2010/0017262 A1 | 1/2010 | Iyer et al. |
| 2010/0036929 A1 | 2/2010 | Scherpa et al. |
| 2010/0042720 A1 | 2/2010 | Stienhans et al. |
| 2010/0057560 A1 | 3/2010 | Skudlark et al. |
| 2010/0057785 A1 | 3/2010 | Khosravy et al. |
| 2010/0076946 A1 | 3/2010 | Barker et al. |
| 2010/0082634 A1 | 4/2010 | Leban |
| 2010/0083136 A1 | 4/2010 | Komine et al. |
| 2010/0088150 A1 | 4/2010 | Mazhar et al. |
| 2010/0092126 A1 | 4/2010 | Kaliszek et al. |
| 2010/0093310 A1 | 4/2010 | Gbadegesin et al. |
| 2010/0107225 A1 | 4/2010 | Spencer et al. |
| 2010/0131868 A1 | 5/2010 | Chawla et al. |
| 2010/0151431 A1 | 6/2010 | Miller |
| 2010/0153835 A1 | 6/2010 | Xiong et al. |
| 2010/0162365 A1 | 6/2010 | Del Real |
| 2010/0162374 A1 | 6/2010 | Nair |
| 2010/0179940 A1 | 7/2010 | Gilder et al. |
| 2010/0185463 A1 | 7/2010 | Noland et al. |
| 2010/0185932 A1 | 7/2010 | Coffman et al. |
| 2010/0191689 A1 | 7/2010 | Cortes et al. |
| 2010/0198783 A1 | 8/2010 | Wang et al. |
| 2010/0198871 A1 | 8/2010 | Stiegler et al. |
| 2010/0198944 A1 | 8/2010 | Ho et al. |
| 2010/0205537 A1 | 8/2010 | Knighton et al. |
| 2010/0218237 A1 | 8/2010 | Ferris et al. |
| 2010/0223378 A1 | 9/2010 | Wei |
| 2010/0229085 A1 | 9/2010 | Nelson et al. |
| 2010/0235526 A1 | 9/2010 | Carter et al. |
| 2010/0235539 A1 | 9/2010 | Carter et al. |
| 2010/0241611 A1 | 9/2010 | Zuber |
| 2010/0241972 A1 | 9/2010 | Spataro et al. |
| 2010/0250120 A1 | 9/2010 | Waupotitsch et al. |
| 2010/0251340 A1 | 9/2010 | Martin et al. |
| 2010/0257457 A1 | 10/2010 | De Goes |
| 2010/0262582 A1 | 10/2010 | Garcia-Ascanio et al. |
| 2010/0267588 A1 | 10/2010 | Nelson et al. |
| 2010/0274765 A1 | 10/2010 | Murphy et al. |
| 2010/0274772 A1 | 10/2010 | Samuels |
| 2010/0281118 A1 | 11/2010 | Donahue et al. |
| 2010/0290623 A1 | 11/2010 | Banks et al. |
| 2010/0306379 A1 | 12/2010 | Ferris |
| 2010/0318893 A1 | 12/2010 | Matthews et al. |
| 2010/0322252 A1 | 12/2010 | Suganthi et al. |
| 2010/0325155 A1 | 12/2010 | Skinner et al. |
| 2010/0325527 A1 | 12/2010 | Estrada et al. |
| 2010/0325559 A1 | 12/2010 | Westerinen et al. |
| 2010/0325655 A1 | 12/2010 | Perez |
| 2010/0332401 A1 | 12/2010 | Prahlad et al. |
| 2010/0332962 A1 | 12/2010 | Hammer et al. |
| 2010/0333116 A1 | 12/2010 | Prahlad et al. |
| 2011/0001763 A1 | 1/2011 | Murakami |
| 2011/0016409 A1 | 1/2011 | Grosz et al. |

(56) References Cited

U.S. PATENT DOCUMENTS

| | | |
|---|---|---|
| 2011/0022559 A1 | 1/2011 | Andersen et al. |
| 2011/0022812 A1 | 1/2011 | van der Linden et al. |
| 2011/0029883 A1 | 2/2011 | Lussier et al. |
| 2011/0040812 A1 | 2/2011 | Phillips |
| 2011/0041083 A1 | 2/2011 | Gabai et al. |
| 2011/0047413 A1 | 2/2011 | McGill et al. |
| 2011/0047484 A1 | 2/2011 | Mount et al. |
| 2011/0052155 A1 | 3/2011 | Desmarais et al. |
| 2011/0054968 A1 | 3/2011 | Galaviz |
| 2011/0055299 A1 | 3/2011 | Phillips |
| 2011/0055721 A1 | 3/2011 | Jain et al. |
| 2011/0061045 A1 | 3/2011 | Phillips |
| 2011/0061046 A1 | 3/2011 | Phillips |
| 2011/0065082 A1 | 3/2011 | Gal et al. |
| 2011/0066951 A1 | 3/2011 | Ward-Karet et al. |
| 2011/0083167 A1 | 4/2011 | Carpenter et al. |
| 2011/0093567 A1 | 4/2011 | Jeon et al. |
| 2011/0099006 A1 | 4/2011 | Sundararaman et al. |
| 2011/0107205 A1 | 5/2011 | Chow et al. |
| 2011/0113320 A1 | 5/2011 | Neff et al. |
| 2011/0119313 A1 | 5/2011 | Sung et al. |
| 2011/0137991 A1 | 6/2011 | Russell |
| 2011/0142410 A1 | 6/2011 | Ishii |
| 2011/0145744 A1 | 6/2011 | Haynes et al. |
| 2011/0161289 A1 | 6/2011 | Pei et al. |
| 2011/0167125 A1 | 7/2011 | Achlioptas |
| 2011/0167353 A1 | 7/2011 | Grosz et al. |
| 2011/0167435 A1 | 7/2011 | Fang |
| 2011/0185292 A1 | 7/2011 | Chawla et al. |
| 2011/0202424 A1 | 8/2011 | Chun et al. |
| 2011/0202599 A1 | 8/2011 | Yuan et al. |
| 2011/0208958 A1 | 8/2011 | Stuedi et al. |
| 2011/0209064 A1 | 8/2011 | Jorgensen et al. |
| 2011/0213765 A1 | 9/2011 | Cui et al. |
| 2011/0219419 A1 | 9/2011 | Reisman |
| 2011/0225417 A1 | 9/2011 | Maharajh et al. |
| 2011/0238458 A1 | 9/2011 | Purcell et al. |
| 2011/0238621 A1 | 9/2011 | Agrawal |
| 2011/0238759 A1 | 9/2011 | Spataro et al. |
| 2011/0239135 A1 | 9/2011 | Spataro et al. |
| 2011/0246294 A1 | 10/2011 | Robb et al. |
| 2011/0246950 A1 | 10/2011 | Luna et al. |
| 2011/0252071 A1 | 10/2011 | Cidon |
| 2011/0252320 A1 | 10/2011 | Arrasvuori et al. |
| 2011/0252339 A1 | 10/2011 | Lemonik et al. |
| 2011/0258461 A1 | 10/2011 | Bates |
| 2011/0258561 A1 | 10/2011 | Ladouceur et al. |
| 2011/0282710 A1 | 11/2011 | Akkiraju et al. |
| 2011/0289433 A1 | 11/2011 | Whalin et al. |
| 2011/0296022 A1 | 12/2011 | Ferris et al. |
| 2011/0313803 A1 | 12/2011 | Friend et al. |
| 2011/0320197 A1 | 12/2011 | Conejero et al. |
| 2012/0036370 A1 | 2/2012 | Lim et al. |
| 2012/0064879 A1 | 3/2012 | Panei |
| 2012/0072436 A1 | 3/2012 | Pierre et al. |
| 2012/0079095 A1 | 3/2012 | Evans et al. |
| 2012/0089659 A1 | 4/2012 | Halevi et al. |
| 2012/0092055 A1 | 4/2012 | Peschke et al. |
| 2012/0110005 A1 | 5/2012 | Kuo et al. |
| 2012/0110436 A1 | 5/2012 | Adler, III et al. |
| 2012/0110443 A1 | 5/2012 | Lemonik et al. |
| 2012/0117626 A1 | 5/2012 | Yates et al. |
| 2012/0124306 A1 | 5/2012 | Abercrombie et al. |
| 2012/0124547 A1 | 5/2012 | Halbedel |
| 2012/0130900 A1 | 5/2012 | Tang et al. |
| 2012/0134491 A1 | 5/2012 | Liu |
| 2012/0136936 A1 | 5/2012 | Quintuna |
| 2012/0144283 A1 | 6/2012 | Hill et al. |
| 2012/0150888 A1 | 6/2012 | Hyatt et al. |
| 2012/0151551 A1 | 6/2012 | Readshaw et al. |
| 2012/0158908 A1 | 6/2012 | Luna et al. |
| 2012/0159178 A1 | 6/2012 | Lin et al. |
| 2012/0159310 A1 | 6/2012 | Chang et al. |
| 2012/0173625 A1 | 7/2012 | Berger |
| 2012/0179981 A1 | 7/2012 | Whalin et al. |
| 2012/0185355 A1 | 7/2012 | Kilroy |
| 2012/0185913 A1 | 7/2012 | Martinez et al. |
| 2012/0192055 A1 | 7/2012 | Antebi et al. |
| 2012/0192086 A1 | 7/2012 | Ghods et al. |
| 2012/0203908 A1 | 8/2012 | Beaty et al. |
| 2012/0204032 A1 | 8/2012 | Wilkins et al. |
| 2012/0214444 A1 | 8/2012 | McBride et al. |
| 2012/0218885 A1 | 8/2012 | Abel et al. |
| 2012/0221789 A1 | 8/2012 | Felter |
| 2012/0226767 A1 | 9/2012 | Luna et al. |
| 2012/0233155 A1 | 9/2012 | Gallmeier et al. |
| 2012/0233205 A1 | 9/2012 | McDermott |
| 2012/0233543 A1 | 9/2012 | Vagell et al. |
| 2012/0240061 A1 | 9/2012 | Hillenius et al. |
| 2012/0240183 A1 | 9/2012 | Sinha |
| 2012/0257249 A1 | 10/2012 | Natarajan |
| 2012/0263166 A1 | 10/2012 | Cho et al. |
| 2012/0266203 A1 | 10/2012 | Elhadad et al. |
| 2012/0284638 A1 | 11/2012 | Cutler et al. |
| 2012/0284664 A1 | 11/2012 | Zhao |
| 2012/0291011 A1 | 11/2012 | Quine |
| 2012/0296790 A1 | 11/2012 | Robb |
| 2012/0309540 A1 | 12/2012 | Holme et al. |
| 2012/0311157 A1 | 12/2012 | Erickson et al. |
| 2012/0317239 A1 | 12/2012 | Mulder et al. |
| 2012/0317487 A1 | 12/2012 | Lieb et al. |
| 2012/0328259 A1 | 12/2012 | Seibert, Jr. et al. |
| 2012/0331177 A1 | 12/2012 | Jensen |
| 2012/0331441 A1 | 12/2012 | Adamson |
| 2013/0007245 A1 | 1/2013 | Malik et al. |
| 2013/0007471 A1 | 1/2013 | Grab et al. |
| 2013/0007894 A1 | 1/2013 | Dang et al. |
| 2013/0013560 A1 | 1/2013 | Goldberg et al. |
| 2013/0014023 A1 | 1/2013 | Lee et al. |
| 2013/0042106 A1 | 2/2013 | Persaud et al. |
| 2013/0055127 A1 | 2/2013 | Saito et al. |
| 2013/0067232 A1 | 3/2013 | Cheung et al. |
| 2013/0073403 A1 | 3/2013 | Tuchman et al. |
| 2013/0080919 A1 | 3/2013 | Kiang et al. |
| 2013/0117337 A1 | 5/2013 | Dunham |
| 2013/0117376 A1 | 5/2013 | Filman et al. |
| 2013/0124638 A1 | 5/2013 | Barreto et al. |
| 2013/0138608 A1 | 5/2013 | Smith |
| 2013/0138615 A1 | 5/2013 | Gupta et al. |
| 2013/0159411 A1 | 6/2013 | Bowen |
| 2013/0163289 A1 | 6/2013 | Kim et al. |
| 2013/0167253 A1 | 6/2013 | Seleznev et al. |
| 2013/0185347 A1 | 7/2013 | Romano |
| 2013/0185558 A1 | 7/2013 | Seibert et al. |
| 2013/0191339 A1 | 7/2013 | Haden et al. |
| 2013/0198600 A1 | 8/2013 | Lockhart et al. |
| 2013/0212486 A1 | 8/2013 | Joshi et al. |
| 2013/0218978 A1 | 8/2013 | Weinstein et al. |
| 2013/0239049 A1 | 9/2013 | Perrodin et al. |
| 2013/0246932 A1 | 9/2013 | Zaveri et al. |
| 2013/0262210 A1 | 10/2013 | Savage et al. |
| 2013/0262862 A1 | 10/2013 | Hartley |
| 2013/0268480 A1 | 10/2013 | Dorman |
| 2013/0268491 A1 | 10/2013 | Chung et al. |
| 2013/0275398 A1 | 10/2013 | Dorman et al. |
| 2013/0275429 A1 | 10/2013 | York et al. |
| 2013/0275509 A1 | 10/2013 | Micucci et al. |
| 2013/0282830 A1 | 10/2013 | Besen et al. |
| 2013/0305039 A1 | 11/2013 | Gauda |
| 2013/0326344 A1 | 12/2013 | Masselle et al. |
| 2014/0007205 A1 | 1/2014 | Oikonomou |
| 2014/0013112 A1 | 1/2014 | Cidon et al. |
| 2014/0019497 A1 | 1/2014 | Cidon et al. |
| 2014/0019498 A1 | 1/2014 | Cidon et al. |
| 2014/0032489 A1 | 1/2014 | Hebbar et al. |
| 2014/0032616 A1 | 1/2014 | Nack |
| 2014/0033277 A1 | 1/2014 | Xiao et al. |
| 2014/0033291 A1 | 1/2014 | Liu |
| 2014/0052939 A1 | 2/2014 | Tseng et al. |
| 2014/0068589 A1 | 3/2014 | Barak |
| 2014/0150023 A1* | 5/2014 | Gudorf et al. .................. 725/38 |

(56) References Cited

U.S. PATENT DOCUMENTS

2014/0156373 A1 6/2014 Roberts et al.
2014/0172595 A1 6/2014 Beddow et al.

FOREIGN PATENT DOCUMENTS

| | | |
|---|---|---|
| CN | 102264063 A | 11/2011 |
| EP | 0348614 A2 | 1/1990 |
| EP | 0921661 A2 | 6/1999 |
| EP | 1349088 | 10/2003 |
| EP | 1528746 A2 | 5/2005 |
| EP | 1933242 A1 | 6/2008 |
| EP | 2372574 A1 | 10/2011 |
| EP | 2610776 A2 | 7/2013 |
| GB | 2453924 A | 4/2009 |
| GB | 2471282 A | 12/2010 |
| JP | 09-101937 | 4/1997 |
| JP | 11-025059 | 1/1999 |
| JP | 2003273912 A | 9/2003 |
| JP | 2004310272 A | 11/2004 |
| JP | 09-269925 | 10/2007 |
| JP | 2008250944 | 10/2008 |
| KR | 20020017444 A | 3/2002 |
| KR | 20040028036 | 4/2004 |
| KR | 20050017674 A | 2/2005 |
| KR | 20060070306 A | 6/2006 |
| KR | 20060114871 A | 11/2006 |
| KR | 20070043353 A | 4/2007 |
| KR | 20070100477 A | 10/2007 |
| KR | 20100118836 A | 11/2010 |
| KR | 20110074096 A | 6/2011 |
| KR | 20110076831 A | 7/2011 |
| WO | WO-0007104 A1 | 2/2000 |
| WO | WO-0219128 A1 | 3/2002 |
| WO | WO-2004097681 | 11/2004 |
| WO | WO-2006028850 A2 | 3/2006 |
| WO | WO-2007024438 A1 | 3/2007 |
| WO | WO-2007035637 A2 | 3/2007 |
| WO | WO-2007113573 A2 | 10/2007 |
| WO | WO-2008011142 A2 | 1/2008 |
| WO | WO-2008076520 A2 | 6/2008 |
| WO | WO-2011109416 A2 | 9/2011 |
| WO | WO-2012167272 A1 | 12/2012 |
| WO | WO-2013009328 A2 | 1/2013 |
| WO | WO-2013013217 A1 | 1/2013 |
| WO | WO-2013041763 A1 | 3/2013 |
| WO | WO-2013166520 | 11/2013 |

OTHER PUBLICATIONS

Burns, "Developing Secure Mobile Applications for Android," Oct. 2008, Version 1.0, 1-28 pages.
Comes, "MediaXchange User's Manual," Version 1.15.15, Feb. 1, 2009, pp. 1-90.
Exam Report for GB1308842.2, Applicant: Box, Inc. Mailed Mar. 10, 2014, 4 pages.
Exam Report for GB1312264.3, Applicant: Box, Inc. Mailed Mar. 24, 2014, 7 pages.
Exam Report for GB1314771.5, Applicant: Box, Inc. Mailed Feb. 17, 2014, 7 pages.
Search Report for EP 11729851.3, Applicant: Box, Inc. Mailed Feb. 7, 2014, 9 pages.
Search Report for EP14153783.7, Applicant: Box, Inc. Mailed Mar. 24, 2014, 7 pages.
John et al., "Always Sync Support Forums—View topic—Allway sync funny behavior," Allway Sync Support Forum at http://sync-center.com, Mar. 28, 2011, XP055109680, 2 pages.
Search Report for EP14151588.2, Applicant: Box, Inc. Mailed Apr. 15, 2014, 12 pages.
International Search Report and Written Opinion for PCT/US2011/039126 mailed on Oct. 6, 2011, pp. 1-13.
International Search Report PCT/US2008/012973 dated Apr. 30, 2009, pp. 1-3.
Partial International Search PCT/US2011/041308 dated Feb. 27, 2012, pp. 1-2.
Supplementary European Search Report European Application No. EP 08 85 8563 dated Jun. 20, 2011 pp. 1-5.
Written Opinion PCT/US2008/012973 dated Apr. 30, 2009, pp. 1-4.
International Search Report and Written Opinion for PCT/US2011/056472 mailed on Jun. 22, 2012, pp. 1-12.
Langfeld L. et al., "Microsoft SharePoint 2003 Unleashed," Chapters 11 and 15, Jun. 2004, pp. 403-404, 557-561, 578-581.
"Revolving sync conflicts; frequently asked questions," Microsoft Tech Support, Jul. 16, 2012, retrieved from the Internet: http://web.archive.org/web, 2 pages.
"Troubleshoot sync problems," Microsoft Tech Support: May 2, 2012, retrieved from the internet, http://web. Archive.org/web, 3 pages.
"Tulsa TechFest 2012—Agenda," retrieved from the website, http://web.archive.org, Oct. 2, 2012, 2 pages.
Cohen, "Debating the Definition of Cloud Computing Platforms," retrieved from the internet, http://forbes.com, Feb. 3, 2014, 7 pages.
Delendik, "Evolving with Web Standards—The Story of PDF.JS," retrieved from the internet, http://people.mozilla.org, Oct. 12, 2012, 36 pages.
Delendik, "My PDF.js talk slides from Tulsa TechFest, retrieved from the internet," http://twitter.com, Oct. 12, 2012, 2 pages.
Duffy, "The Best File-Syncing Services," pcmag.com, retrieved from the internet: http://www.pcmag.com, Sep. 28, 2012, 7 pages.
Exam Report for EP13177108.1, Applicant: Box, Inc. Mailed May 26, 2014, 6 pages.
Exam Report for GB1318792.7, Applicant: Box, Inc. Mailed May 22, 2014, 2 pages.
Partial Search Report for EP131832800, Applicant: Box, Inc. Mailed May 8, 2014, 5 pages.
Pyle et al., "How to enable Event logging for Offline Files (Client Side Caching) in Windows Vista," Feb. 18, 2009, retrieved from the internet: http://blogs.technet.com, 3 pages.
Rao, "Box Acquires Crocodoc to Add HTML5 Document Converter and Sleek Content Viewing Experience to Cloud Storage Platform," retrieved from the internet, http://techcrunch.com, May 9, 2013, 8 pages.
Search Report for EP13187217.8, Applicant: Box, Inc. Mailed Apr. 15, 2014, 12 pages.
Search Report for EP141509422, Applicant: Box, Inc. Mailed May 8, 2014, 7 pages.
Sommerer, "Presentable Document Format: Improved On-demand PDF to HTML Conversion," retrieved from the internet, http://research.microsoft.com, 8 pages.
Tulloch et al., "Windows Vista Resource Kit," Apr. 8, 2007, Microsoft Press, XP055113067, 6 pages.
Walker, "PDF.js project meeting notes," retrieved from the internet, http://groups.google.com, May 15, 2014, 1 page.
International Search Report and Written Opinion for PCT/US2010/070366, Applicant: Box, Inc., Mailed Mar. 24, 2013, 10 pages.
"How-to Geek, How to Sync Specific Folders With Dropbox," downloaded from the internet http://www.howtogeek.com, Apr. 23, 2013, 5 pages.
International Search Report and Written Opinion for PCT/US2013/020267, Applicant: Box, Inc., Mailed May 7, 2013, 10 pages.
International Search Report and Written Opinion for PCT/US2013/034662, Applicant: Box, Inc., Mailed May 31, 2013, 10 pages.
Exam Report for GB1306011.6, Applicant: Box, Inc. Mailed Apr. 18, 2013, 8 pages.
Exam Report for GB1300188.8, Applicant: Box, Inc. Mailed May 31, 2013, 8 pages.
"Conceptboard", One-Step Solution for Online Collaboration, retrieved from websites http://conceptboard.com and https://www.youtube.com/user/ConceptboardApp?feature=watch, printed on Jun. 13, 2013, 9 pages.
Exam Report for EP13158415.3, Applicant: Box, Inc. Mailed Jun. 4, 2013, 8 pages.
International Search Report and Written Opinion for PCT/US2013/029520, Applicant: Box, Inc., Mailed Jun. 26, 2013, 10 pages.
International Search Report and Written Opinion for PCT/US2013/023889, Applicant: Box, Inc., Mailed Jun. 24, 2013, 13 pages.

(56) References Cited

OTHER PUBLICATIONS

International Search Report and Written Opinion for PCT/US2013/035404, Applicant: Box, Inc., Mailed Jun. 26, 2013, 13 pages.
International Search Report and Written Opinion for PCT/US2013/039782, Applicant: Box, Inc., Mailed Aug. 28, 2013, 15 pages.
Exam Report for GB1313559.5, Applicant: Box, Inc., Mailed Aug. 22, 2013, 19 pages.
Exam Report for GB1410569.6 Applicant: Box, Inc. Mailed Jul. 11, 2014, 9 pages.
Sommerer, "Presentable Document Format: Improved On-demand PDF to HTML Conversion," retrieved from the internet, http://research.microsoft.com, Nov. 2004, 8 pages.
International Search Report and Written Opinion for PCT/US2011/041308 Mailed Jul. 2, 2012, pp. 1-16.
International Search Report and Written Opinion for PCT/US2011/060875 Mailed Oct. 30, 2012, pp. 1-10.
Extended Search Report for EP131832800, Applicant: Box, Inc. Mailed Aug. 25, 2014, 7 pages.
Extended Search Report for EP141509422, Applicant: Box, Inc. Mailed Aug. 26, 2014, 12 pages.
Search Report for EP 13189144.2 Applicant: Box, Inc. Mailed Sep. 1, 2014, 9 pages.
Exam Report for GB1312874.9 Applicant: Box, Inc. Mailed Sep. 26, 2014, 2 pages.
Exam Report for GB1415126.0 Applicant: Box, Inc. Mailed Oct. 2, 2014, 8 pages.
Exam Report for GB1415314.2 Applicant: Box, Inc. Mailed Oct. 7, 2014, 6 pages.
Exam Report for GB1309209.3 Applicant: Box, Inc. Mailed Oct. 7, 2014, 3 pages.
Exam Report for GB1315232.7 Applicant: Box, Inc. Mailed Oct. 9, 2014, 5 pages.
Exam Report for GB1318789.3 Applicant: Box, Inc. Mailed Oct. 30, 2014, 6 pages.
Microsoft Windows XP Professional Product Documentation: How Inheritance Affects File and Folder Permissions, Apr. 11, 2014, 2 pages.
Exam Report for GB1317393.5 Applicant: Box, Inc. Mailed Nov. 7, 2014, 6 pages.
Exam Report for GB1311417.8 Applicant: Box, Inc. Mailed Nov. 7, 2014, 2 pages.
Exam Report for GB1311421.0 Applicant: Box, Inc. Mailed Nov. 7, 2014, 4 pages.
"Understanding Metadata," National Information Standards Organization, NISO Press, 2004, 20 pages.
International Search Report and Written Opinion for PCT/US2012/056955, Applicant: Box, Inc., Mailed Mar. 27, 2013, pp. 1-11.
International Search Report and Written Opinion for PCT/US2011/047530, Applicant: Box, Inc., Mailed Mar. 22, 2013, pp. 1-10.
International Search Report and Written Opinion for PCT/US2012/065617, Applicant: Box, Inc., Mailed Mar. 29, 2013, 9 pages.
International Search Report and Written Opinion for PCT/US2012/067126, Applicant: Box, Inc., Mailed Mar. 29, 2013, 10 pages.
International Search Report and Written Opinion for PCT/US2012/063041, Applicant: Box, Inc., Mailed Mar. 29, 2013, 12 pages.
International Search Report and Written Opinion for PCT/US2011/057938, Applicant: Box, Inc., Mailed Mar. 29, 2013, 10 pages.
Parr, "Google Docs Improves Commenting, Adds E-mail Notifications," Apr. 16, 2011, mashable.com, pp. 1-6.
"Microsoft Office SharePoint 2007 User Guide," Feb. 16, 2010, pp. 1-48.
Lars, "35 Very Useful Online Tools for Improving your project Management and Team Collaboration," Apr. 31, 2010, tripwiremagazine.com, pp. 1-32.
Exam Report for EP13168784.0, Applicant: Box, Inc. Mailed Nov. 21, 2013, 7 pages.
Exam Report for EP13185269.1, Applicant: Box, Inc. Mailed Jan. 28, 7 pages.
Exam Report for GB1311417.8, Applicant: Box, Inc. Mailed Dec. 20, 2013, 5 pages.
Exam Report for GB1312095.1, Applicant: Box, Inc. Mailed Dec. 12, 2013, 7 pages.
Exam Report for GB1312874.9, Applicant: Box, Inc. Mailed Dec. 20, 2013, 11 pages.
Exam Report for GB1316971.9, Applicant: Box, Inc. Mailed Nov. 26, 2013, 10 pages.
Exam Report for GB1317600.3, Applicant: Box, Inc. Mailed Nov. 21, 2013, 8 pages.
Exam Report for GB1318373.6, Applicant: Box, Inc. Mailed Dec. 17, 2013, 4 pages.
Exam Report for GB1320902.8, Applicant: Box, Inc. Mailed Dec. 20, 2013, 4 pages.
International Search Report and Written Opinion for PCT/US2013/034765, Applicant: Box, Inc., Mailed Jan. 20, 2014, 15 pages.
Patent Court Document of Approved Judgment for GB0602349.3 and GB0623571.7; Mar. 3, 2009, 17 pages.
Internet Forums, http://web.archive.org/web/20100528195550/http://en.wikipedia.org/wiki/Internet_forums, Wikipedia, May 30, 2010, pp. 1-20.
Yahoo! Groups, http://web.archive.org/web/20090320101529/http://en.wikipedia.org/wiki/Yahoo!_Groups, Wikipedia, Mar. 20, 2009, pp. 1-6.
Wiki, http://web.archive.org/web/20100213004936/http://en.wikipedia.org/wiki/Wiki, Feb. 13, 2010, pp. 1-16.
Conner, "Google Apps: The Missing Manual," publishing by O'Reilly Media, May 27, 2008, 24 pages.
Cisco, "FTP Load Balancing on ACE in Routed Mode Configuration Example," DocWiki, Jun. 2011, 7 pages.
Palemr, "Load Balancing FTP Servers," BlogNav, Oct. 2008, 2 pages.
Wayback, "Wayback machine," Wayback, Jun. 1, 2011, 1 page.
"PaperPort Professional 14," PC Mag. Com review, published Feb. 2012, Ziff Davis, Inc., 8 pages.
"PaperPort," Wikipedia article (old revision), published May 19, 2012, Wikipedia Foundation, 2 pages.
"Quickoffice Enhances Android Mobile office Application for improved Productivity on latest Smartphone and Table Devices," QuickOffice Press Release, Nov. 21, 2011, QuickOffice Inc., 2 pages.
Exam Report for GB1309209.3, Applicant: Box, Inc, Mailed Oct. 30, 2013, 11 pages.
Exam Report for GB1310666.1, Applicant: Box, Inc. Mailed Aug. 30. 2013, 10 pages.
Exam Report for GB1316532.9, Applicant: Box, Inc. Mailed Oct. 31, 2013, 10 pages.
Exam Report for GB1316533.7, Applicant: Box, Inc. Mailed Oct. 8, 2013, 9 pages.
Gedymin, "Cloud computing with an emphasis on Google App Engine," Master Final Project, Sep. 2011, 146 pages.
Google Docs, http://web. Archive.org/web/20100413105758/http://en.wikipedia.org/wiki/Google_docs, Apr. 13, 2010, 6 pages.
Exam Report for GB1316682.2 Applicant: Box, Inc. Mailed Nov. 19, 2014, 6 pages.
Exam Report for GB1312095.1 Applicant: Box, Inc. Mailed Nov. 19, 2014, 5 pages.
Exam Report for GB1313559.5 Applicant: Box, Inc. Mailed Nov. 4, 2014, 2 pages.
User's Guide for SMART Board Software for Windows, published Dec. 2004, 90 pages.
Zambonini et al., "Automated Measuring of Interaction with User Interfaces," Published as WO2007113573 Oct. 2007, 19 pages.
Exam Report for GB1309209.3 Applicant: Box, Inc. Mailed Jan. 19, 2015, 6 pages.
"Agilewords—How to Request Approval," YouTube, http://www.youtube.com/watch?v=3-Ov3DYNN3Q, Jan. 31, 2011, 2 pages.
"Agilewords—Features, Powerful Features Yet Simple," Jun. 1, 2011, http://web.archive.org/web/20110601223756/http://agilewords.com/product/features, 3 pages.
Conner, "Google Apps: The Missing Manual," published by O'Reilly Media, May 27, 2008, 42 pages.

(56) References Cited

OTHER PUBLICATIONS

Exam Report for EP 13177108.1, Applicant: Box, Inc. Mailed Feb. 17, 2015, 6 pages.
Exam Report for GB1312264.3 Applicant: Box, Inc. Mailed Jan. 30, 2015, 5 pages.
Exam Report for GB1312874.9 Applicant: Box, Inc. Mailed Feb. 10, 2015, 7 pages.
Exam Report for GB1316685.5 Applicant: Box, Inc. Mailed Feb. 17, 2015, 5 pages.
Exam Report for EP 13185269.1, Applicant: Box, Inc. Mailed Feb. 13, 2015, 8 pages.

* cited by examiner

Status Information 511

| Type | Availabiliy | Location |
|---|---|---|
| Original | Available | Location_1 |
| Web I/F (for PC) | Available | Location_2 |
| PDF (for iOS) | Available | Location_3 |
| PNG (for Droid) | Not Available | Location_4 |
| ... | | |

*FIG. 5A*

Capabilities Coding 533

| Source Format | Coding |
|---|---|
| MicroSoft Word | 0 |
| MicroSoft PowerPoint | 1 |
| Abobe PhotoShop | 2 |
| ... | |

*FIG. 5B*

| Source Format | Coding | Swiping Action | Instruction |
|---|---|---|---|
| MicroSoft Word | 0 | Single Touch (click) | Place cursor at touched location for editing |
| | | Double Touch (click) | Select double clicked word |
| | | Swipe Right-to-Left (when word selected) | Delete selected word |
| | | ... | |
| MicroSoft PowerPoint | 1 | Single Touch (click) | Place cursor at touched location for editing |
| | | Double Touch (click) | Zoom In |
| | | Swipe Right-to-Left | Next Slide |
| | | ... | |
| Abobe PhotoShop | 2 | | |
| ... | | | |

Capabilities Decoding 433

UNIVERSAL FILE TYPE PREVIEW FOR MOBILE DEVICES

BACKGROUND

Online file storage systems typically provide a way for users to upload files to a storage server for backing up files, file access, and/or file distribution. Some online file storage systems allow the user to preview the contents of a file before or in lieu of downloading the file. However, mobile devices are often limited in terms of bandwidth and processing power, and thus are limited in providing universal preview functionality.

BRIEF DESCRIPTION OF THE DRAWINGS

Examples of a web-based content management system with a collaboration environment that provides previewing of files to mobile devices are illustrated in the figures. The examples and figures are illustrative rather than limiting.

FIG. 5A and FIG. 5B depict tables illustrating example status information and capabilities encoding contents.

FIG. 7 depicts a table illustrating example contents of a capabilities decoder on a mobile client device.

DETAILED DESCRIPTION

Figure 1:
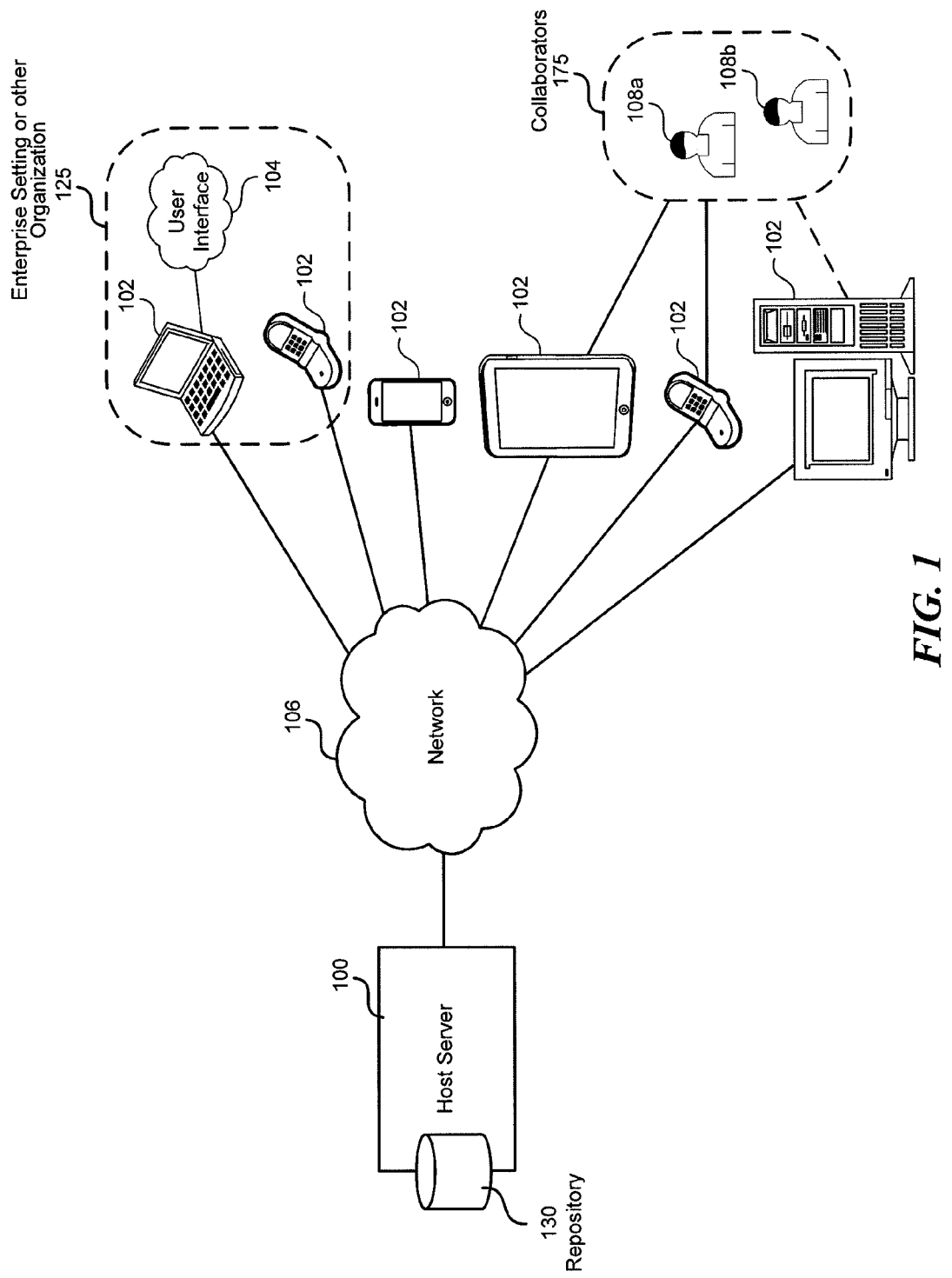
FIG. 1 depicts an example diagram of a system illustrating a host server supporting preview of files in an online collaboration environment.

A system is described for providing content previews of files stored in a web-based collaboration environment or platform to mobile client devices.

The mobile client devices are one of a plurality of collaborators in the web-based collaboration environment. Each collaborator of a workspace in the collaboration environment has the ability to upload files to the workspace. These uploaded files can be downloaded, viewed, and modified, by a variety of clients including mobile client devices. To enable previews of the uploaded files, a conversion engine in the collaboration environment converts the files to target formats, for example, formats visible on the Web, via a web browser, such as Abode Flash small web format (SWF) files. However, these preview formats are either not compatible with mobile client devices or too large to be efficient for file preview.

Accordingly, the described systems generate a special preview for mobile client devices using intermediate file segments that are byproducts of the conversion engines conversion from a source format to a target format. For example, in one embodiment, during the conversion of an uploaded file from a source format to a target format, a number of intermediate file segment byproducts are generated. The intermediate file segment byproducts represent the original file but have an intermediate format. The described systems generate a special preview for mobile client devices using intermediate file segment byproducts.

Further, providing the mobile client device with a universal previewer allows the mobile client device to display and modify the intermediate file segment byproducts via special swiping actions that are determined based on the original or source file type. It is appreciated that the terminology 'mobile client device' used herein refers to small form factor devices that tend to have limited bandwidth and processing capabilities as compared with standard laptops, desktops, and other personal computing devices. Examples of mobile client devices include, but are not limited to, mobile device running Android or iOS platforms.

Various aspects and examples of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the technology. Certain terms may even be emphasized below; however, any terminology intended to be interpreted in any restricted manner will be overtly and specifically defined as such in this Detailed Description section.

FIG. 1 illustrates an example diagram of a system where a host server 100 supports previewing of files for users 108 in an online collaboration environment so that the users 108 do not have to download the file to access its contents. Further, the host server 100 provides notifications of activities that occur in the online collaboration environment in real time or near real time to users 108.

The client devices 102 can be any system and/or device, and/or any combination of devices/systems that is able to establish a connection, including wired, wireless, cellular connections with another device, a server and/or other systems such as host server 100 and/or conversion servers 150. Client devices 102 will typically include a display and/or other output functionalities to present information and data exchanged between or among the client devices 102 and/or the host server 100. It is appreciated that a single host server 100 is shown for simplicity. Some or all of the functionality described within the host server 100 may be distributed among any number of machines. For example, in one embodiment, one or more conversion servers may perform the file conversions described herein. Further, in one embodiment, one or more notification servers may perform the notifications described herein.

The client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaming device or console, an iPhone, and/or any other portable, mobile, hand held devices, etc. In one embodiment, the client devices 102 and host server 100 are coupled via a network 106. In some embodiments, the devices 102 and host server 100 may be directly connected to one another.

The input mechanism on client devices 102 can include a touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used in the disclosed technology by various users or collaborators (e.g., collaborators 108) for accessing, through network 106, a web-based collaboration environment or online collaboration platform (e.g., hosted by the host server 100).

The collaboration platform or environment hosts workspaces with work items that one or more users can access (e.g., view, edit, update, revise, comment, discussions, download, preview, tag, or otherwise manipulate, etc.). A work item can generally include any type of digital or electronic content that can be viewed or accessed via an electronic device (e.g., device 102). The digital content can include .pdf files, .doc, slides (e.g., Powerpoint slides), images, audio files, multimedia content, web pages, blogs, etc. A workspace can generally refer to any grouping of a set of digital content in the collaboration platform. The grouping can be created, identified, or specified by a user or through other means. This user may be a creator user or administrative user, for example.

In general, a workspace can be associated with a set of users or collaborators (e.g., collaborators 108) which have access to the content included therein. The levels of access (e.g., based on permissions or rules) of each user or collaborator to access the content in a given workspace may be the same or may vary among the users. Each user may have their own set of access rights to every piece of content in the workspace, or each user may have different access rights to different pieces of content. Access rights may be specified by a user associated with a work space and/or a user who created/uploaded a particular piece of content to the workspace, or any other designated user or collaborator.

In general, the collaboration platform allows multiple users or collaborators to access or collaborate efforts on work items such that each user can see, remotely, edits, revisions, comments, or annotations being made to specific work items through their own user devices. For example, a user can upload a document to a work space for other users to access (e.g., for viewing, editing, commenting, discussing, signing-off, or otherwise manipulating). The user can login to the online platform and upload the document (or any other type of work item) to an existing work space or to a new work space. The document can be shared with existing users or collaborators in a work space.

Figure 2:
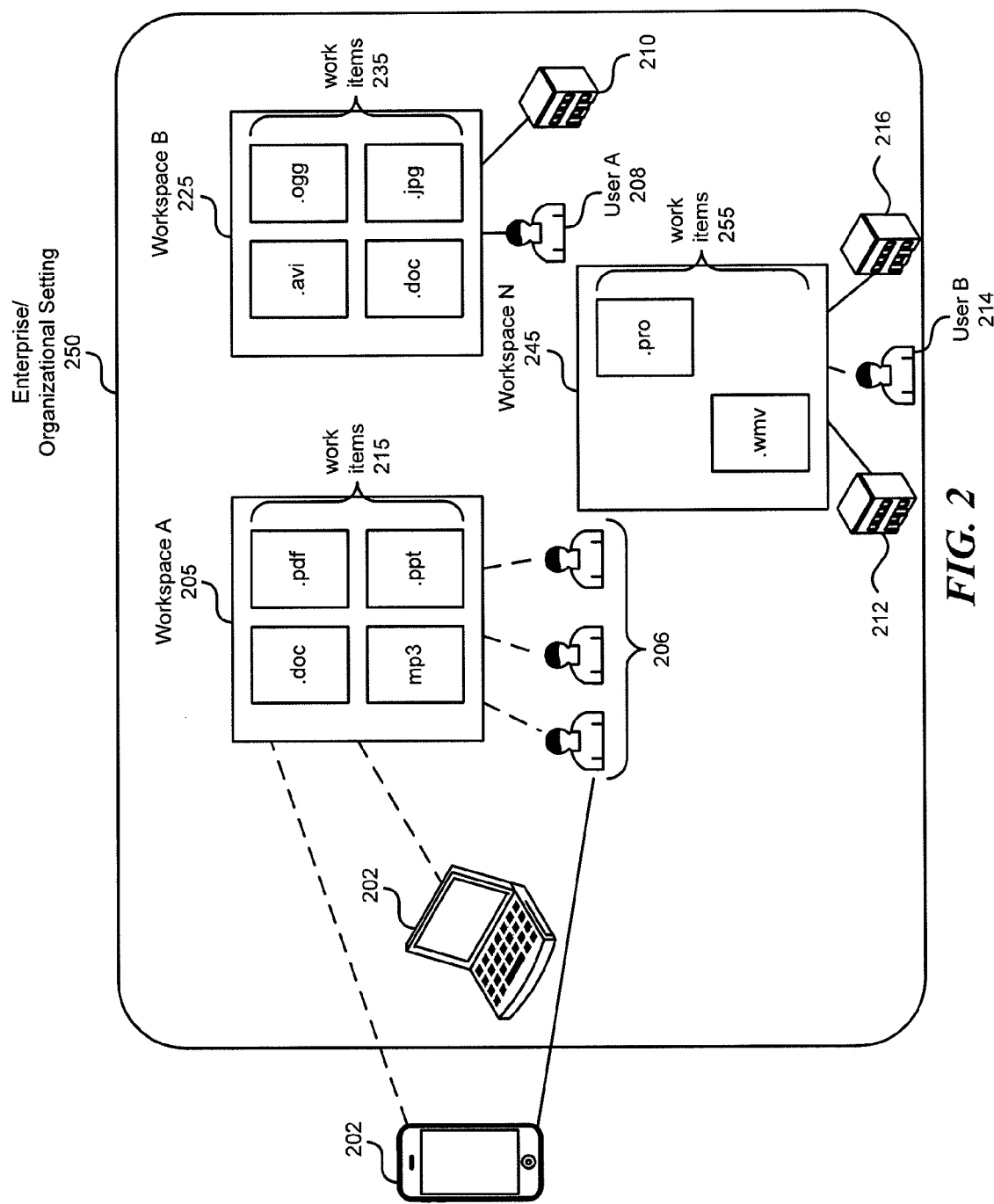
FIG. 2 depicts an example diagram of a web-based or online collaboration platform deployed in an enterprise or other organizational setting for organizing work items and workspaces.

A diagrammatic illustration of the online collaboration environment and the relationships between workspaces and users/collaborators are illustrated with further reference to the example of FIG. 2.

In one embodiment, actions performed on work items or other activities that occur in a work space can be detected in real time or in near real time. In addition, users, collaborators, or select users can be notified in real time or near real-time of these actions or activities. Various mechanisms can be used to notify users or collaborators, including through the web interface to access the collaboration platform, via email, and/or SMS, for example.

Functions and techniques disclosed for previewing of files or work items in the online platform can be performed by the host server 100 of the collaboration platform. Functions and techniques performed by the host server 100 and the related components therein are described, respectively, in detail with further reference to the examples of FIGS. 3 and 4A-4C.

In one embodiment, client devices 102 communicate with the host server 100 over network 106. In general, network 106, over which the client devices 102 and the host server 100 communicate may be a cellular network, a telephonic network, an open network, such as the Internet, or a private network, such as an intranet and/or the extranet, or any combination or variation thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

FIG. 2 depicts an example diagram of a web-based or online collaboration platform deployed in an enterprise or other organizational setting 250 for organizing work items 215, 235, 255 and workspaces 205, 225, 245.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in an organizational setting, multiple workspaces (e.g., workspace A, B C) can be created to support different projects or a variety of work flows. Each workspace can have its own associated work items. For example, work space A 205 may be associated with work items 215, work space B 225 can be associated with work items 235, and work space N 245 can be associated with work items 255. The work items 215, 235, and 255 may be unique to each work space but need not be. For example, a particular word document can be associated with only one work space (e.g., work space A 205) or it may be associated with multiple work spaces (e.g., Work space A 205 and work space B 225, etc.).

In general, each work space has a set of users or collaborators associated with it. For example, work space A 205 is associated with multiple users or collaborators 206. In some instances, work spaces deployed in an enterprise may be department specific. For example, work space B may be associated with department 210 and some users shown as example user A 208 and workspace N 245 can be associated with departments 212 and 216 and users shown as example user B 214.

Each user associated with a work space can generally access the work items associated with the work space. The level of access will depend on permissions associated with the specific work space, and/or with a specific work item. Permissions can be set for the work space or set individually on a per work item basis. For example, the creator of a work space (e.g., one of user A 208 who creates work space B) can set one permission setting applicable to all work items 235 for other associated users and/or users associated with the affiliate department 210, for example. Creator user A 208 may also set different permission settings for each work item, which may be the same for different users, or varying for different users.

In each work space A, B . . . N, when an action is performed on a work item by a given user or any other activity is detected in the work space, other users in the same work space may be notified in real time or in near real time. Activities which trigger real time notifications can include, by way of example but not limitation, adding, deleting, or modifying collaborators in the work space, adding, deleting a work item in the work space, and/or creating a discussion topic in the work space. In one embodiment, a mobile client device receives a notification that a file has been uploaded to the web-based collaboration platform prior to sending the request to preview the uploaded file.

The activity can be performed in relation to a discussion topic in the work space, for example, adding a response to a discussion topic, deleting a response, or editing a response in the work space. In addition, the activity is performed on a work item in the work space by the user, including, by way of example but not limitation, download or upload of a work item, deletion of editing of the work item, selecting, adding, deleting, and modifying a tag in the work item, preview of the work item or comment of the work item, setting or changing permissions of the work item, sharing a work item, emailing a link to the work item, and/or embedding a link to the work item on another website.

Figure 3:
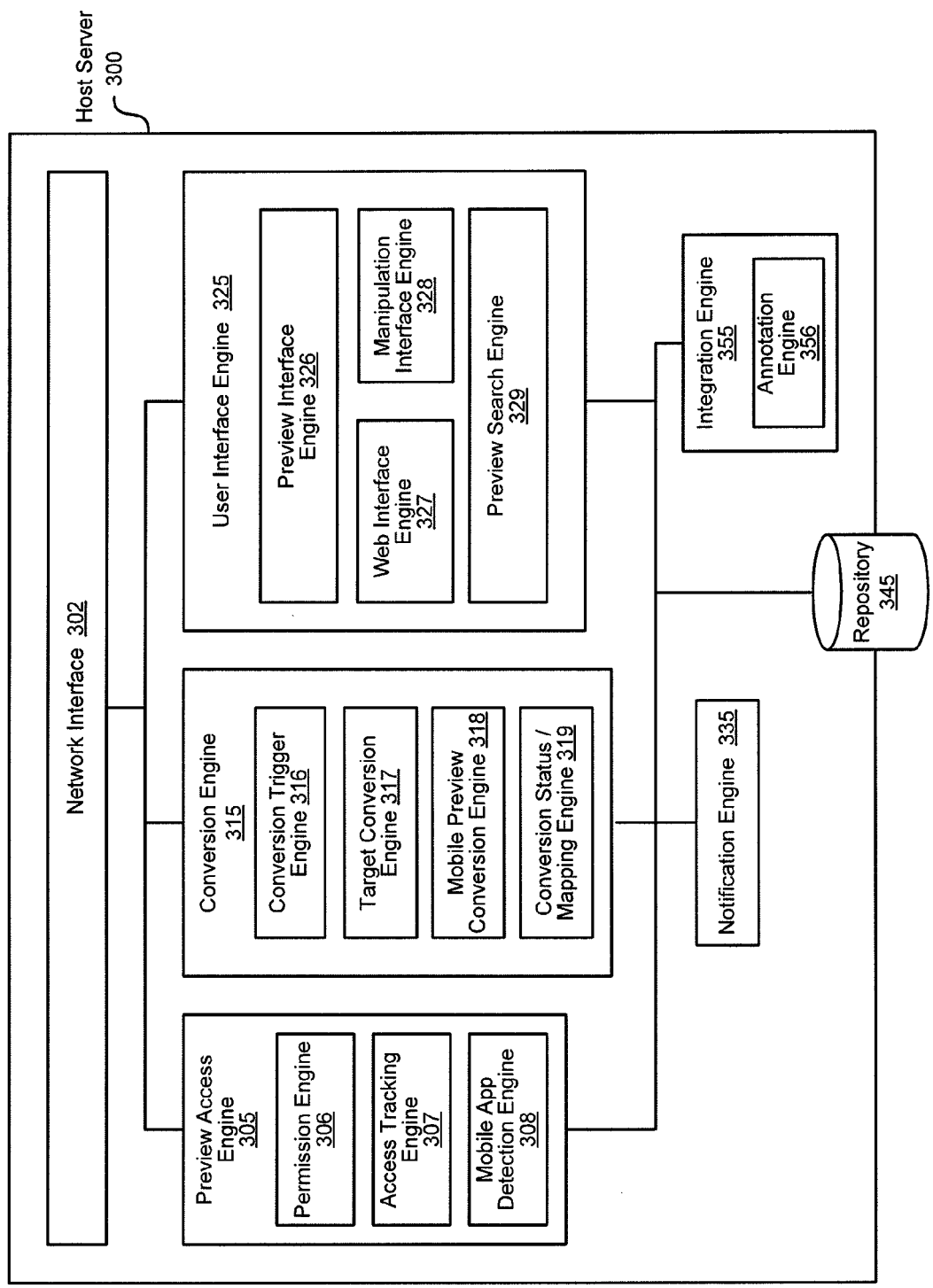
FIG. 3 depicts a block diagram illustrating an example of components in a host server of a web-based collaboration environment that supports previewing of files.

FIG. 3 depicts a block diagram illustrating an example of components in a host server 100 of a web-based collaboration environment that supports previewing of files.

The host server 100, although illustrated as comprised of distributed components (physically distributed and/or functionally distributed), could be implemented as a collective element. The host server 100 of the web-based or online collaboration environment can generally be a cloud-based service. The host server 100 can include, for example, a network interface 302, a preview access engine 305, a conversion engine 315, a user interface engine 325, a notification engine 335, a repository 345, and an integration engine 355. Additional or fewer components/modules/engines can be included in the host server 100 and each illustrated component.

The network interface 302 can be a networking module that enables the host server 100 to mediate data in a network with an entity that is external to the host server 100, through any known and/or convenient communications protocol supported by the host and the external entity. The network interface 302 can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.), Bluetooth, a router, an access point, a wireless router, a switch, a multilayer switch, a protocol converter, a gateway, a bridge, bridge router, a hub, a digital media receiver, and/or a repeater.

As used herein, a "module," "a manager," "a handler," a "detector," an "interface," or an "engine" includes a general purpose, dedicated or shared processor and, typically, firmware or software modules that are executed by the processor. Depending upon implementation-specific or other considerations, the module, manager, handler, or engine can be centralized or its functionality distributed. The module, manager, handler, or engine can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

One embodiment of the host server 100 includes the preview access engine 305. The preview access engine 305 includes a permission engine 306, an access track engine 307, and a mobile application detection engine 308. The permission engine 306 is configured to grant permission to users requesting permission to preview certain files if they meet specified criteria.

The access tracking engine 307 tracks the permission levels of users requesting a preview of a file. A user should be an authorized collaborator of the workspace in which the file is stored to be granted permission to view a preview of the file. Additionally, the user who uploads the file to the workspace is also permitted to view a preview of the file. In some instances the person who uploads may not be an authorized collaborator of the workspace, for example, and administrator, but the person may need to check whether the file was properly uploaded.

Figure 6:
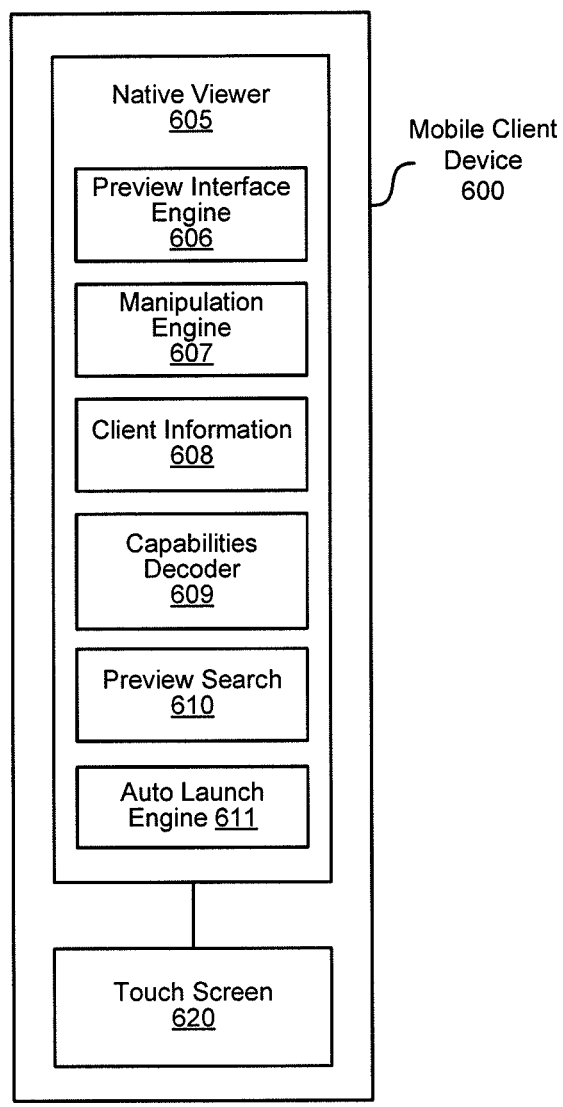
FIG. 6 depicts a block diagram illustrating an example of components in a mobile client device.

The mobile application detection engine 308 detects whether the host server web interface is being accessed from a mobile client device using a standard mobile web browser, and if so, detects whether the mobile client device has a specific preview application installed on the device (e.g., native viewer 605 of FIG. 6). If the specific preview application is detected, then the mobile application detection engine

308 sends an instruction to the mobile client device to launch the application so that files can be previewed via the specific preview application (e.g., native viewer).

One embodiment of the host server 100 includes the conversion engine 315. As previously discussed all or part of the functionality described with respect to the conversion engine 315 can be distributed among any number of servers and/or machines. The conversion engine 315 is configured for converting a file stored in the web-based content management system with collaboration environment to a target file format suitable for providing a preview of the file. The conversion engine 315 includes a conversion trigger engine 316, a target conversion engine 317, a mobile preview conversion engine 318, and a conversion status/mapping engine 319.

The conversion engine 315 is configured to convert a file stored in the web-based content management system with collaboration environment based on a conversion event. The conversion trigger engine 316 manages and generates the conversion event trigger. The conversion trigger engine 316 may trigger a conversion based on any number of occurrences, timers, periodically, etc. In one embodiment, the conversion trigger engine 316 triggers a conversion when a file is uploaded to the web-based content management system with collaboration environment. This scenario is discussed in further detail with respect to FIG. 4A. In another embodiment, the conversion trigger engine 316 triggers a conversion when a preview of the file is first accessed from a mobile client device. This scenario is discussed in further detail with respect to FIG. 4B. In yet another embodiment, the conversion trigger engine 316 triggers a conversion when the conversion trigger engine 316 identifies a pattern of previously previewed files. In this case, the conversion trigger engine 316 does a smart conversion (i.e., converts a file prior to the file being requested for preview) based on a pattern of recent previously requested previews of other files.

The target conversion engine 317 receives a conversion trigger from the conversion trigger engine 316 and responsively converts an input file having a source format to a target format for general preview. In one embodiment, in the process of converting the source format to the target format, the target conversion engine 317 generates a plurality of intermediate file segment byproducts having an intermediate file format. The intermediate file segment byproducts may be saved to repository 345.

The target conversion engine 317 can use a variety of conversion tools to convert the source format to the target format. Non-limiting examples of conversion tools include mencoder and ffmpeg. In one embodiment, the target conversion engine manages subsystems that are designed to handle specific formats. For example, Microsoft Office is ideally suited to convert MSWord and PowerPoint documents; thus, a Windows-based subsystem can be used to handle MS Office file formats.

In one embodiment, the target conversion engine 317 can perform a hard-coded conversion process where specific tools are used to convert certain input formats to a specified output format.

In one embodiment, the target conversion engine 317 takes an input file having a supported source format and converts the input file for display on a device in a web page via, for example, a browser. Although not shown for simplicity, the target conversion engine 317 can include a viewer module that uses a flash-based browser document viewer. In this case, the document viewer is embedded in a webpage. In one embodiment, the viewer displays Abode Flash small web format (SWF) files, however, other examples and input file types are also possible. The conversion engine 317 includes tools to convert the variety of source input formats to the variety of target formats.

While the SWF format is the target format for a Flash-based document viewer, a person of skill in the art will appreciate that any other file format can be the preferred target format, depending on the device, browser, or target system displaying the preview. Thus, although the SWF format is referred to herein as the target output format, any other preferred file format can be the target output format (e.g., PDF file format or HTML file format). In one embodiment the system can produce any one, or all of the three formats (e.g., SWF format, PDF format, and/or HTML format), or other formats, depending on parameters that specify the desired output or target format. In another embodiment, the system can alternatively or additionally produce a variety of image formats.

In one example of operation, a user who uploads a file to the content management system can use the content preview feature to check whether the file was successfully uploaded. It is important to ensure the preview provided to the user appears as close as possible to the actual appearance of the document when opened using the file's native program to reassure the user that the file was not corrupted during the upload process.

One embodiment of the conversion engine 317 converts input files having a source format to an intermediate PDF format prior to final conversion to a target output format. An intermediate PDF format is often used because the PDF file format is very popular and conversion tools are readily available for converting a file to or from the PDF file format. Once an input file is converted to the intermediate PDF format, the system can convert it to any target format that is needed for display on a particular device, browser, or system. For similar reasons, input image files are often converted to the popular PNG format as an intermediate format before being converted by the system to the requested target format. In addition, some intermediate file formats are preferred for displaying the file on certain devices, such as the PDF format for displaying on a mobile device such as an iPhone or an iPad. However, a person of skill in the art will appreciate that an input file can be converted to any other convenient type of intermediate file format, such as HTML or Post Script file formats. Further, input files are not limited to text and/or image files. Rather, input files can also be any other type of file including, but not limited to video and/or audio of various multimedia formats. Any of these file formats can be converted to any convenient intermediate file format prior to conversion to a desired target format.

There are several open source libraries that are available for parsing PDF files and converting PDF files to other formats. For example, the pdf2swf program is one of the tools provided by the SWFTools library that can be used to convert PDF files to an Abobe Flash SWF file. The pdf2swf program uses the open source xpdf library to parse the PDF file and then provide instructions for generating the SWF file. In addition, Poppler is another open PDF rendering library called The mobile preview conversion engine 318 receives the plurality of intermediate file segment byproducts having an intermediate file format from the target conversion engine 317 and generates preview information for accessing and manipulating the intermediate file segment byproducts. In one embodiment, some or all of the preview information includes meta data and/or one or more uniform resource locators (URL). In addition, the preview information may include aggregate information such as the total number of intermediate file segment byproducts associated with the file. In one embodiment, each of the file segment byproducts represents a single page of the original upload file.

In one embodiment, the mobile preview conversion engine 318 produces a plurality of files at different qualities. For example, the mobile preview conversion engine may generate a plurality of images at different scales. The images can cover various parts or aspects of the original document (or the segment byproduct). Further, in some cases the images can be used as a rough file preview on the mobile client device until better quality (higher fidelity) documents replace the rough preview information. In some cases, these intermediate previews may be stored in a repository and used as thumbnails for both mobile and non-mobile devices.

The conversion status/mapping engine 319 maintains availability status for various mobile and non-mobile client devices based on the type of device. As is discussed below, in some embodiments, the preview interface engine 326 includes a client type detector that identifies the type of mobile client device attempting to preview the file stored in the web-based content management system with collaboration environment. The preview engine determines the preview format based on the type of the mobile client device and the conversion status/mapping engine 319 keeps track of whether the file requested for preview has been converted or not. In addition, the conversion status/mapping engine 319 also tracks the location or address in repository 345 for accessing the previews based on the type of device. An example of the information that the conversion status/mapping engine 319 tracks is discussed in greater detail with respect to FIG. 5A.

One embodiment of the host server 100 includes the user interface engine 325. The user interface engine 325 provides an interface between the web-based content management system with collaboration environment and the collaborators (e.g., devices 102 of FIG. 1). As shown, the user interface engine 325 includes a preview interface engine 326, a web interface engine 327, a manipulation interface engine 328, and a preview search engine 329.

The preview interface engine 326 receives requests from mobile client devices to preview files uploaded to the web-based collaboration platform and responsively provides a universal preview to mobile client devices using the intermediate file segment byproducts that are generated during the target conversion. For example, the preview interface engine 326 may receive a request from a mobile client device to preview a file uploaded to a web-based collaboration platform. The intermediate file segment byproducts may be subsequently accessed from repository 345 and provided to the mobile client device.

In one embodiment, the intermediate file segment byproducts are modified or altered for optimal preview on the requesting mobile client device. For example, the preview interface engine 326 may include a client type detector that identifies the type of mobile client device requesting to preview the uploaded file. Alternatively or additionally, the preview interface engine 326 may receive the client type with the preview request.

In one embodiment, an input file having a source format may be converted to a target format resulting in intermediate file segment byproducts having a PDF format. Responsive to a conversion event, the intermediate file segments may subsequently be converted from the PDF format to a PNG format if the preview interface engine 326 determines that the mobile client is, for example, an iPhone or an iPad. Moreover, it is appreciated that in some circumstances (e.g., when the mobile client device is an Android device) the intermediate PDF format may be altered for optimal preview on the Android mobile client device but nevertheless still remain a PDF file format.

The web interface engine 327 interacts with non-mobile client devices such as, for example, personal computers via a web browser interface. More specifically, in one example of operation, a personal computer may upload a file to the web-based collaboration platform using a web browser. The user may then, via the web browser running on the personal computer, access a flash preview of the file to ensure proper upload. Some mobile client devices include web browsers that may be able to access the web interface engine 327 in addition to being able to access the preview interface engine 326. However, it is appreciated that the preview interface engine 326 is optimized to interact with these mobile client devices. Furthermore, it is likely that the mobile client devices cannot preview the target files (e.g., flash files).

The manipulation interface engine 328 interacts with the mobile client devices to manipulate one or more of the intermediate file segments. The manipulation interface also receives modified or altered segments (e.g., annotated) from mobile client devices and interfaces with the integration engine 355 to integrate the modifications.

The preview search engine 329 interacts with the mobile client devices to receive search queries and or criteria and responsively provide one or more of the intermediate file segments matching the search criteria. For example, the preview search engine 329 may receive a text based search, meta data search, etc., One embodiment of the host server 100 includes the notification engine 335 for providing real time or near real time notifications of activities that occur in a web-based or online collaboration environment. For example, in one embodiment, the notification engine 335 sends a notification of an activity that occurs within a collaboration platform to a recipient. The notification is sent such that the recipient is notified in real time or near real time to when the activity occurred or when the activity was performed. Real time notification can be performed via push technology, for example by a push server (not shown) through long polls (e.g., via a long poll engine) and/or through the HTTP streaming (e.g., via an HTTP streaming engine). The notification engine 335 can communicate with the host server to determine a recipient to notify. The notification engine 335 can also determine the activity to notify the recipient of, for example through communication with the host server.

In one embodiment, the notification is presented in a feed stream among other notifications through a user interface on the user device according to relevancy to the user determined based on current or recent activity of the user in the web-based collaboration environment. In one embodiment, the notification engine 335 can send notifications to users via SMS. In this instance, the notification engine 335 can be coupled to an SMS center which forwards the SMS text message to a mobile device over a cellular network. The notification can be sent via SMS in real time or near real time, or with a delay.

One embodiment of the host server 100 includes the repository 345. Repository 345 can store information such as software, descriptive data, images, system information, drivers, and/or any other data item utilized by parts of the host server 100 for operation. The repository 345 can be managed by a database management system (DBMS) such as, but not limited to, Oracle, DB2, Microsoft Access, Microsoft SQL Server, PostgreSQL, MySQL, FileMaker, etc. The repository 345 can be implemented via object-oriented technology and/or via text files, and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package. As shown, the repository 345 is coupled to host server 100. It is appreciated that, in some embodiments, the repository 345 may be directly coupled to network 106. Moreover, it is appreciated that repository 345 may be physically distributed and/or functionally distributed is some embodiments.

One embodiment of the host server 100 includes the integration engine 355. The integration engine 355 is configured to integrate segments annotated and/or otherwise modified by mobile client devices and integrate the annotated segments by modifying the original file with the annotations. A more detailed example of operation of the integration engine is discussed with reference to FIG. 8B.

The components described with reference to the example of FIGS. 4A-4C can be the same components described with reference to FIG. 3; although alternative configurations are possible.

Figure 4A:
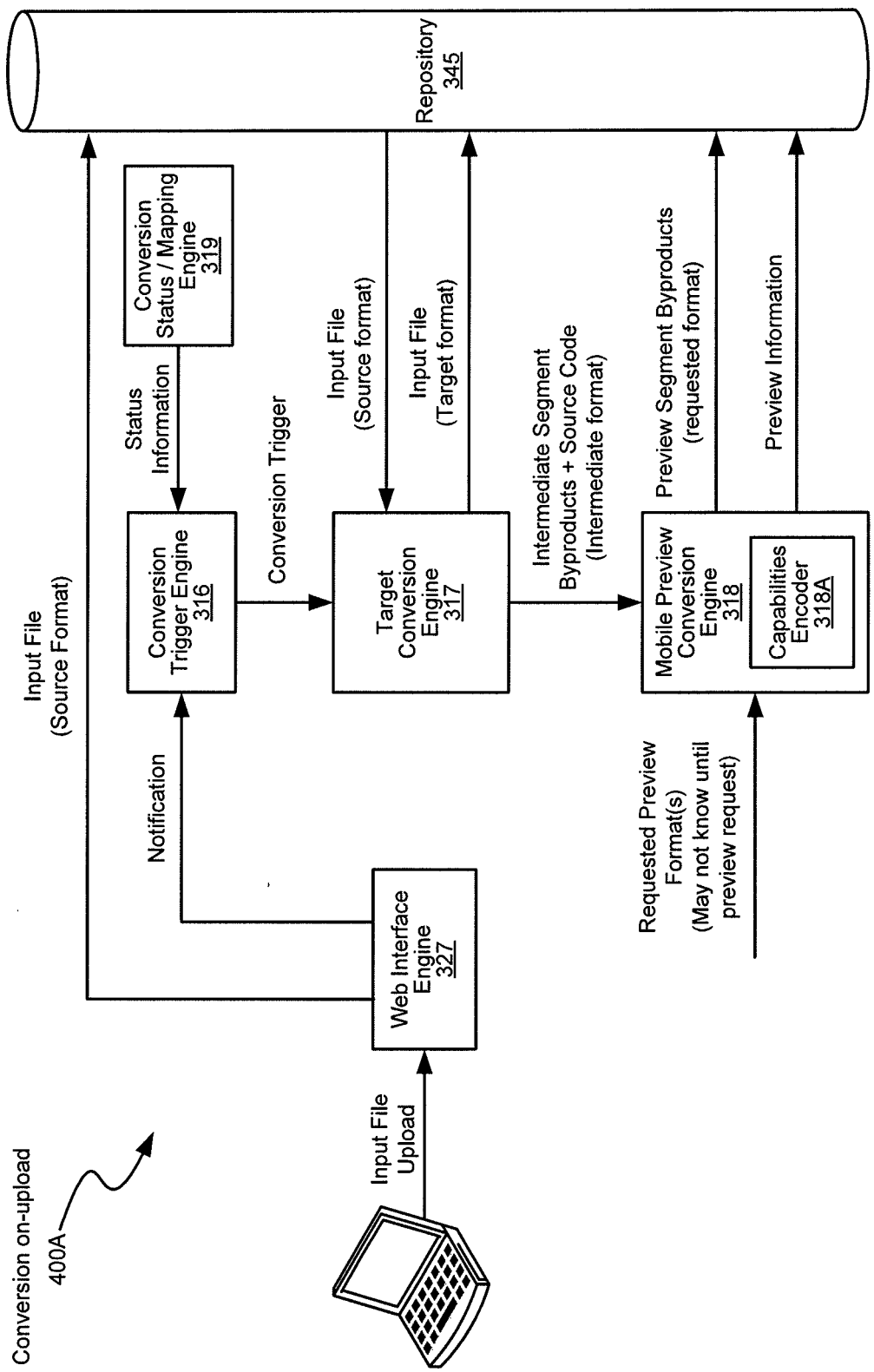
FIGS. 4A-4C depict example diagrams illustrating operation of a host server supporting preview of files to mobile client devices in an online collaboration environment.

Referring first to FIG. 4A, which illustrates operation of the host server 100 for supporting preview of files to mobile client devices in an online collaboration environment, according to an embodiment, whereby an input file is converted from a source format to a target format on upload 400.

In this example, a conversion event occurs because a new file is uploaded to a web-based collaboration platform. To begin, an input file having a source format is uploaded to the online collaboration environment via the web interface engine 327. The web interface engine 327 processes the uploaded file, notifies the conversion trigger engine 316, and stores the input file in the repository 345. The conversion trigger engine 316 receives the notification and determines whether a conversion event has occurred. In one embodiment, the conversion trigger engine 316 uses status information provided by the conversion status/mapping engine 319. An example of status information provided by the conversion status/mapping engine 319 is shown in FIG. 5A.

As shown in FIG. 5A, status information 511 can include various types of files along with an indication as to whether or not those files are available (i.e., converted). In the example of FIG. 4A, the conversion trigger engine 316 is configured to convert the original file on upload. Thus, when the notification is received, the conversion trigger engine 316 triggers the target conversion engine 317 to convert the input file from the source format to a standard target format. The input file may be stored in repository 345 in the target format in addition to or in lieu of the source format. In this example, the target format is Abode Flash small web format (SWF) for access via the web interface using a personal computer.

As previously discussed, a plurality of intermediate segment byproducts result from the conversion to the target format. In one embodiment, the intermediate segment byproducts may be a PDF format; however, other formats are also possible. The target conversion engine 317 provides the mobile preview conversion engine 318 with the intermediate segment byproducts and, in this case, information on the original source format. The mobile preview conversion engine 318 can modify or alter the intermediate segment byproducts to conform to one or more requested preview formats. In this case, the requested preview formats may not be known and thus the intermediate segments may be converted to a number of supported formats. For example, the intermediate segment byproducts can be converted into an enhanced PDF format for iOS devices (e.g., iPhone and iPad) and/or a PNG format for Droid devices. It is appreciated that additional conversions and formats are possible.

In one embodiment, the preview information can include a capabilities encoder 318A. The capabilities encoder 318A can indicate the original source formatting of the uploaded file. An example of capabilities coding is shown in FIG. 5B. In one embodiment, the mobile preview conversion engine 318 also generates preview information. The preview information can include, but is not limited to URL and User Interface (UI) access information including: special swiping actions, aggregate file information, etc.

Figure 4B:
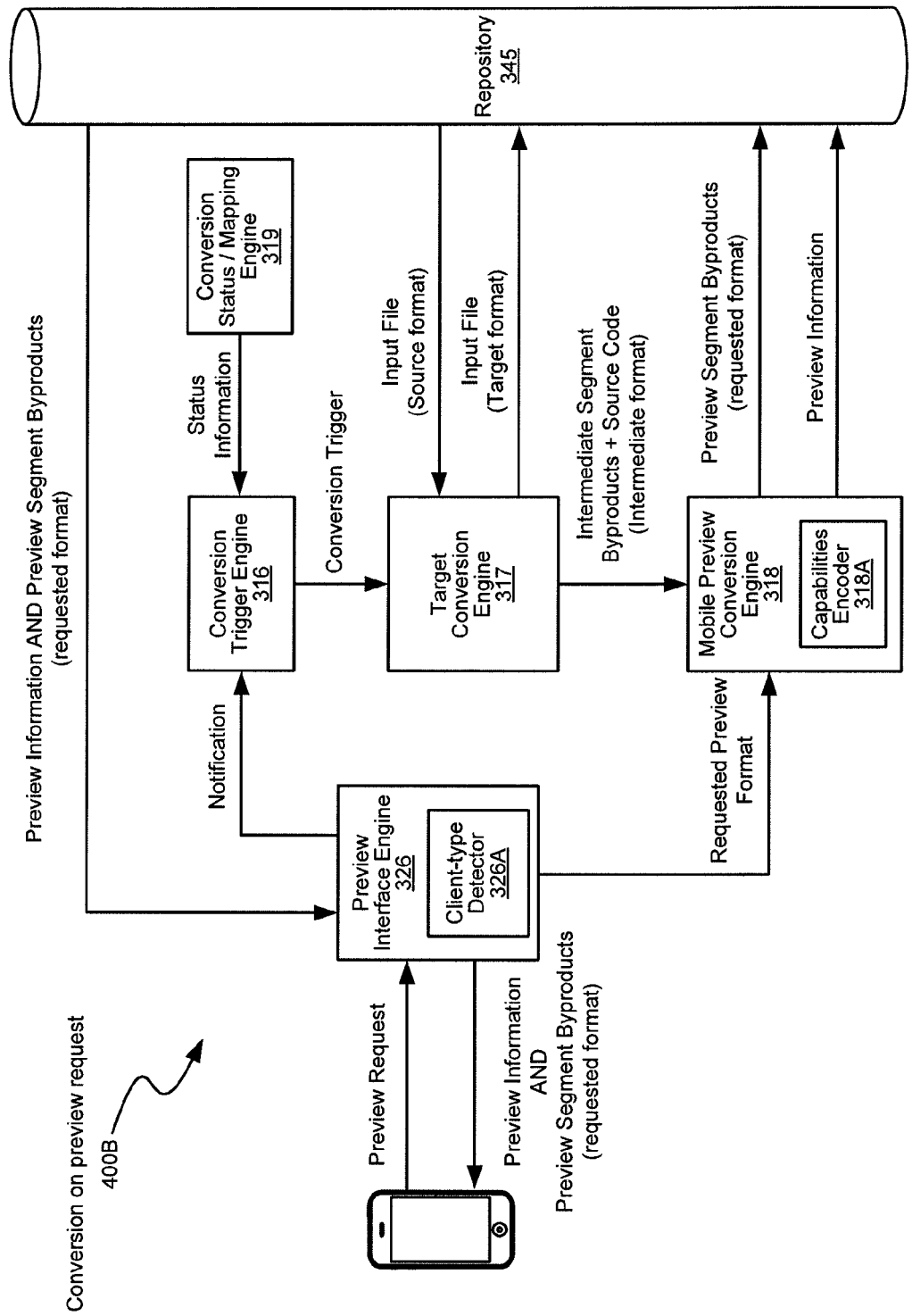

Referring next to FIG. 4B, which illustrates operation of the host server 100 for supporting preview of files to mobile client devices in an online collaboration environment, according to an embodiment, whereby an input file is converted from a source format to a target format upon reception of a preview request from a mobile client device.

In this example, a conversion event occurs because a web-based collaboration platform receives a request from a mobile client device to preview a file previously uploaded to the web-based collaboration platform. To begin, the mobile client device requests preview of a file previously uploaded to the online collaboration environment. In this case, the requested file is not converted on upload as discussed with respect to FIG. 4A. Rather, the requested filed is previously uploaded, for example, by a collaborator using a web browser via the web interface of the collaboration environment. The preview interface engine 326 receives the request. In one embodiment, the request includes a request preview format. For example, the mobile client device may be an Android based device. This information may be included with the preview request. Alternatively, a client type detector 326A may determine the type of mobile client device.

The preview interface engine 326 processes the preview request and notifies the conversion trigger engine 316. The conversion trigger engine 316 receives the notification and determines whether a conversion event has occurred. In one embodiment, the conversion trigger engine 316 uses status information provided by the conversion status/mapping engine 319 to determine if the requested preview information already exists. An example of status information provided by the conversion status/mapping engine 319 is shown in FIG. 5A.

As shown in FIG. 5A, status information 511 can include various types of files along with an indication as to whether or not those files are available (i.e., converted). In the example of FIG. 4B, the conversion trigger engine 316 is configured to convert the original file on first preview request. Thus, when the notification is received, the conversion trigger engine 316 checks the status information and determines that the original file is not yet available (i.e., 'unavailable'). Accordingly, the conversion trigger engine 316 triggers the target conversion engine 317 to convert the input file from the source format to a standard target format. The input file may be stored in repository 345 in the target format in addition to or in lieu of the source format. In this example, the target format is Abode Flash small web format (SWF) for access via the web interface using a personal computer.

Similar to FIG. 4A, a plurality of intermediate segment byproducts result from the conversion from the source format to the target format. However, in the example of FIG. 4B, the preview interface engine 326 provides the mobile preview conversion engine 318 with the identified requested preview format. In this manner, storage space can be saved in the repository 345 because only the requested preview format must be generated as opposed to a variety of supported formats.

Figure 4C:
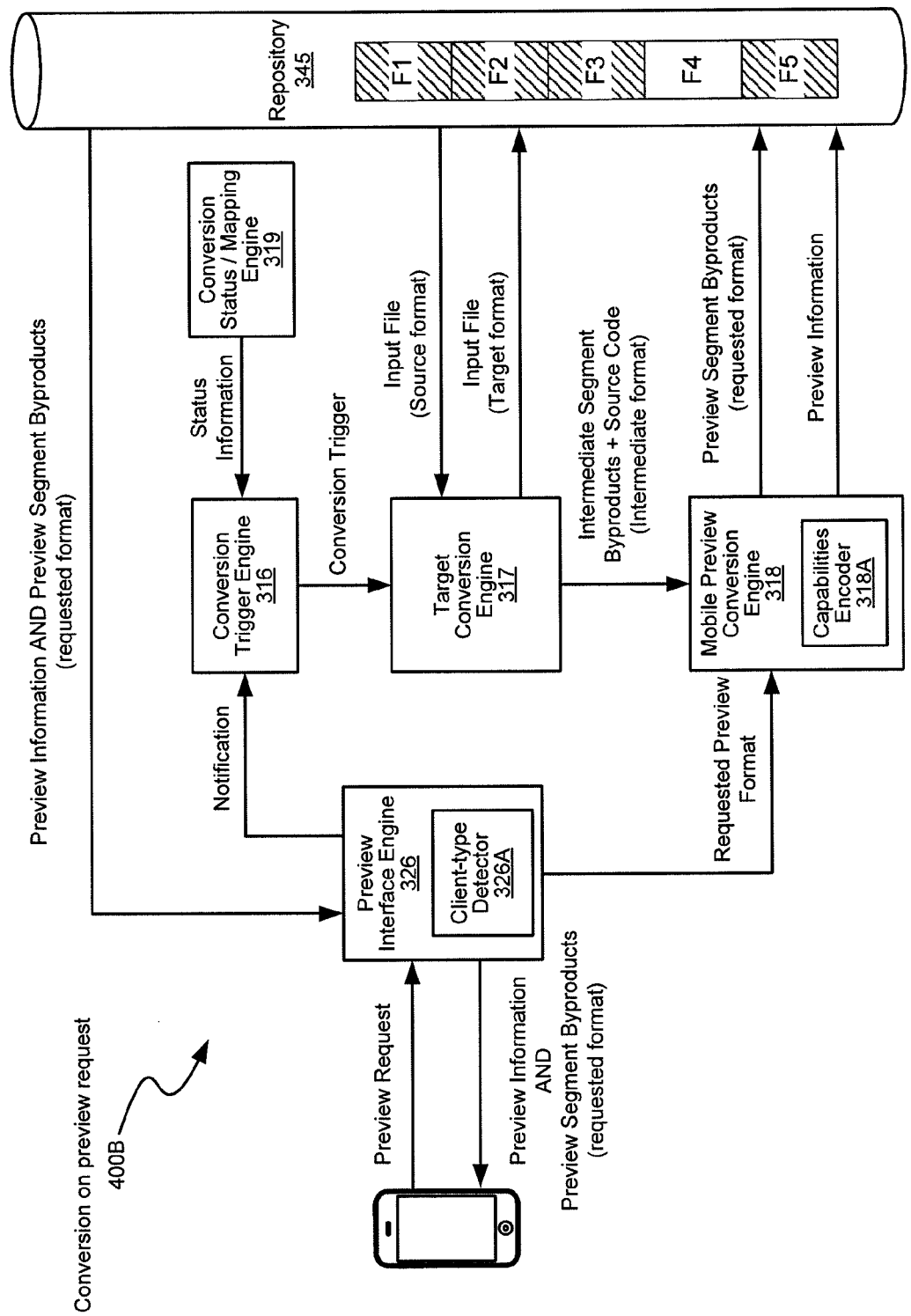

Referring lastly to FIG. 4C, which illustrates operation of the host server 100 for supporting preview of files to mobile client devices in an online collaboration environment, according to an embodiment, whereby a previously uploaded input file is converted from a source format to a target format based upon a pattern of preview requests from the mobile client device.

The example of FIG. 4C is similar to the example of FIG. 4B; however, in the example of FIG. 4C, the conversion trigger engine 316 identifies a pattern of previews requested and automatically converts one or more files based on the identified pattern. For example, mobile preview requests are received for files F1, F2, F3, and F5. Thus, the conversion trigger engine 316 automatically triggers the conversion of file F4. It is appreciated that any number of algorithms may be used to trigger this 'smart' conversion.

FIG. 6 depicts a block diagram illustrating an example of components in a mobile client device 600 that supports a native viewer 605 for previewing files uploaded to a web-based collaboration environment. The mobile client device 600 can be, for example, any mobile client device running an Android or iOS platform. The mobile client device 600 can be an example of several of the client devices 102 of FIG. 1 (e.g., iPad or tablet, iPhone or Android device); however, other configurations are possible.

The mobile client device 600 can include, for example, a wireless communication interface 602, a native viewer 605, and a touch screen 620. Additional or fewer components/modules/engines can be included in the mobile client device 300 and each illustrated component.

The wireless communication interface 602 can include a network interface (not shown) that can be a networking module that enables the mobile client device 600 to communicate data in a network with an entity that is external to the mobile client device 600, through any known and/or convenient wireless communications protocol. The network interface can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.), Bluetooth, a router, an access point, a wireless router, a switch, a multilayer switch, a protocol converter, a gateway, a bridge, bridge router, a hub, a digital media receiver, and/or a repeater.

The native viewer 605 can include a preview interface engine 606, a manipulation engine 607, client information 608, capabilities decoder 609, a preview search 610, and auto launch engine 611. The preview interface engine 606 includes instructions for processing preview information and accessing one or more of the file segments responsive to user input. The manipulation engine 607 is configured manipulate file segments responsive to user input. For example, a user may annotate a previewed file and/or modify the previewed file. Annotations can be text, audio, video, or other annotations. The client information 608 comprises information about the specific native viewer. For example, the version of the viewer and the type of device, etc.

The capabilities decoder 609 is configured to identify and decode actions such as swiping actions. An example of capabilities decoding 433 is shown in discussed in more detail with respect to FIG. 7.

In one embodiment, the preview search 610 interacts with the search engine 329 of FIG. 3 to send search queries and or criteria and responsively receive one or more of the intermediate file segments matching the search criteria. For example, the preview search 610 may send a text based search, meta data search, etc., and receive appropriate intermediate file segments that match the search criteria for preview. Alternatively or additionally, the preview search 610 may have the bulk of the search functionality built in. In this case, the preview search 610 searches the intermediate file segments that it has, and if nothing matches the criteria may expand the search to the host server. In some cases, the expanded search may require additional user intervention (e.g., approval).

In one embodiment, the auto launch engine 611 receives an instruction from the host server (e.g., host server 130) and automatically launches the native viewer (e.g., native viewer application) so that files can be previewed.

The mobile application detection engine 308 detects whether the host server web interface is being accessed from a mobile client device using a standard mobile web browser, and if so, detects whether the mobile client device has a specific preview application installed on the device (e.g., native viewer 605 of FIG. 6). If the specific preview application is detected, then the mobile application detection engine 308 sends an instruction to the mobile client device to launch the application so that files can be previewed via the specific preview application (e.g., native viewer).

In one example of operation, the mobile client device is configured to send via the wireless communication interface 602, a request to preview a file uploaded to a web-based collaboration platform, where the uploaded file has source format, and receive preview information for accessing and manipulating the preview of the uploaded file. The preview information is used by the preview interface engine 606 to access one or more file segments of the uploaded file. The file segments are byproducts of a conversion of the file from the source format to a target format and have a requested preview format. In some embodiments, a scheme included with the preview information is used to access the one or more file segments. The mobile client device then displays the accessed file segments on the touch screen 620. The displayed segments can be responsive to special swiping actions determined based on the source format.

In one embodiment, the capabilities decoder identifies the swiping action decodes the swiping action to identify an instruction to be performed by the native viewer 605. The instruction can be, for example, a request for one or more additional segments to be displayed on the mobile client device, a request to annotate one or more sections of the displayed segment, and/or a request to adjust the displayed segment on the touch screen of the mobile client device for optimal preview.

FIG. 7 depicts a table illustrating example capabilities 433 of a mobile client device having a capabilities decoder. The capabilities decoder uses the source coding (i.e., 'coding') to determine the instruction that is associated with a specific swiping action performed on the touch screen of the mobile client device. Each source coding represents a source file type. Accordingly, a swiping action may indicate one instruction on a file segment that was originally part of a Word file (Word source file) and another different instruction on a file that was originally part of a PowerPoint file (PowerPoint source file). For example, a backward swiping motion may indicate previous slide on the Powerpoint file segment and delete a selected word on the Word file segment.

Figure 8A:
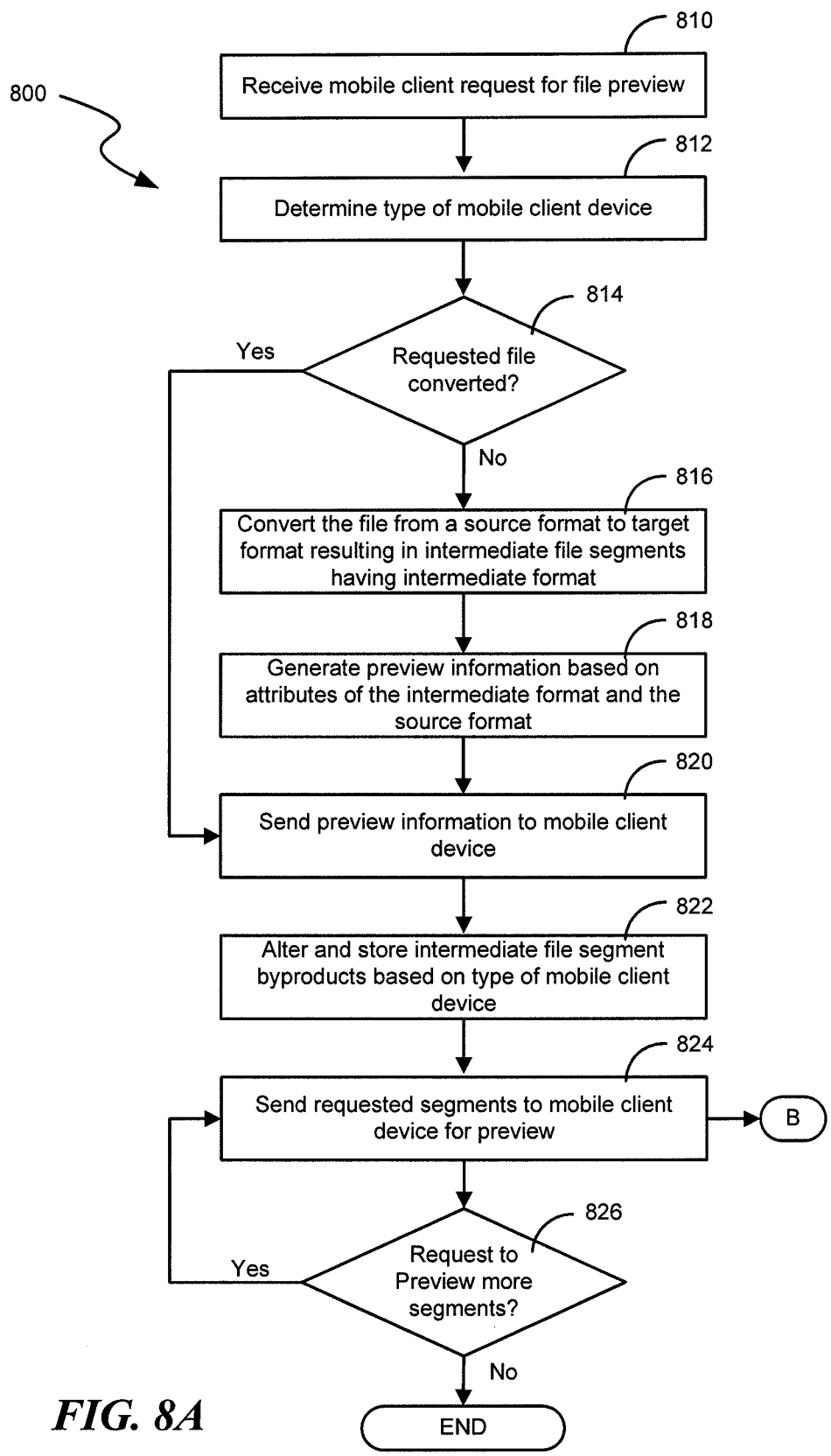
FIG. 8A and FIG. 8B depict a flow chart illustrating an example process for providing a preview of a file in a web-based or online collaboration platform to a mobile client device.
Figure 8B:
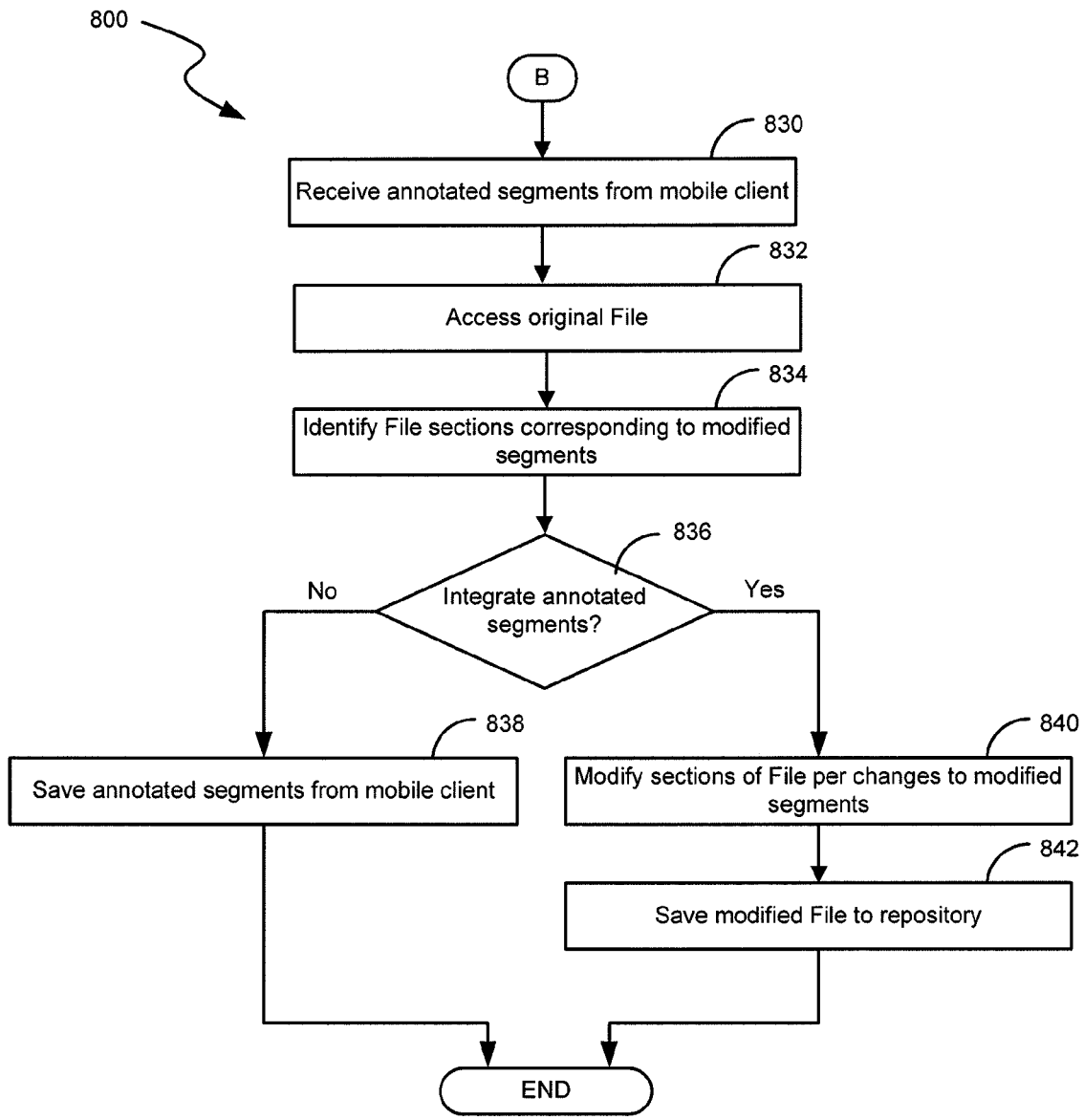

FIG. 8A and FIG. 8B depict a flow chart 800 illustrating an example process for providing a preview of a file in a web-based or online collaboration platform to a mobile client device. More specifically, flow chart 800 illustrates operation of a host server in a web-based collaboration platform. It is appreciated that the host server may be distributed both functionally and geographically.

At block 810, the host server receives a mobile client request for file preview. The host server then determines, at block 812 the type of mobile client device. As previously discussed, in some cases, the type of mobile client device can be determined at the host server via a client-type detector. Likewise, the mobile client request may include the client type information among other information sent to the host server.

The host server subsequently determines, at block 814, whether or not the requested file for preview is already converted to a requested format that is compatible and/or optimal for the mobile client device. If so, the flow chart continues at block 820. However, if the file requested for preview is not converted to the compatible and/or optimal format for the mobile client device then, at block 816, the file is converted from the source format to a target format resulting in intermediate file segments having an intermediate file format. At block 818, preview information is generated based on attributes of the intermediate file format. For example, preview information may include a scheme to access one or more of the file segments. Additionally the preview information may include encoded information identify the source file type. This encoded information may be used by the mobile client device to determine instructions in response to swiping actions identified on the touch screen of the mobile client device.

At block 820, the preview information is sent to the mobile client device. At block 822, the intermediate file segments are altered based on the type of mobile client device and stored. For example, the intermediate file segments may be altered to match a requested file format that is optimal for display and manipulation on the mobile client device. At block 824, the host server sends the requested segments to the mobile client device for preview. It is appreciated that in some instances, the mobile client device may be able to commence preview prior to receiving all of the file segments representing at single file. At block 826, if the mobile device requests additional segments or the host server determines that it needs to send additional segments, then the host server does so at block 824.

At block 830, the host server receives a modified and/or annotated file segment from the mobile client device. The host sever, at block 832, responsively identifies and accesses the original file and, at block 834, identifies sections of the original file that correspond to the modified segments. For example, an intermediate (altered or unaltered) file segment may represent a single page of the originally uploaded file. Accordingly, the host server identifies the appropriate pages. At block 836, if the host server is not configured to integrate the modified segments, then the annotated segments are simply saved in the repository alongside the originals. However, if the host server is configured to integrate the modified segment or annotations into the original file, then at block 840, the host server modifies the identified sections of the original file and, at block 842 saves the modified file to the repository.

Figure 9A:
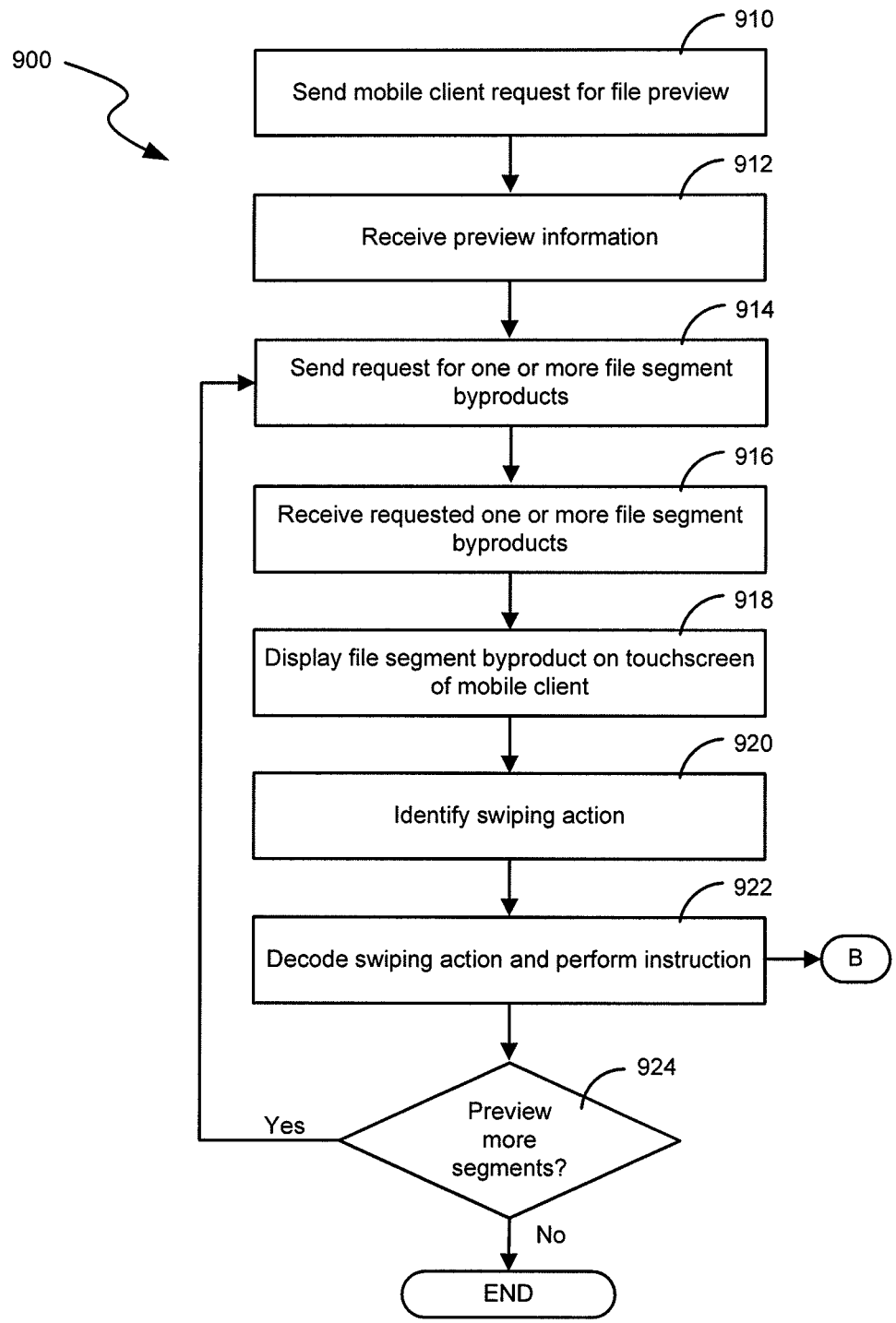
FIG. 9A and FIG. 9B depict a flow chart illustrating an example process for previewing a file from a web-based or online collaboration platform in a mobile client device.
Figure 9B:
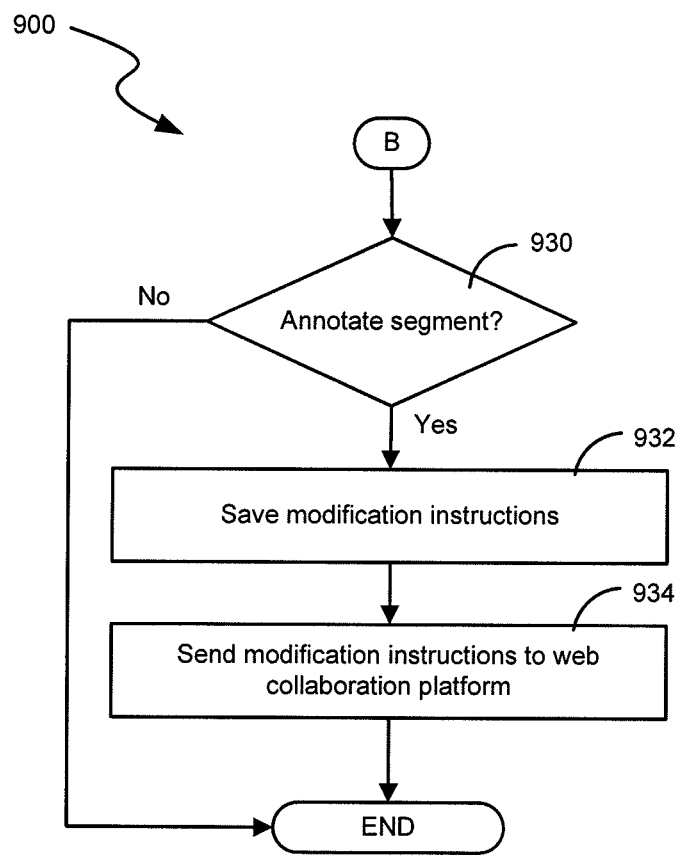

FIG. 9A and FIG. 9B depict a flow chart 900 illustrating an example process for previewing a file from a web-based or online collaboration platform in a mobile client device.

At block 910, the mobile client device sends a preview request for the desired file in the web-based or online collaboration platform. The mobile client device, at block 912, subsequently receives preview information. Alternatively or additionally, the mobile client device may receive one or more of the intermediate file segment byproducts for commencing preview at the mobile client device. At block 914, the mobile client device sends a request for (more) intermediate file segment byproducts. The mobile client device subsequently receives, at block 916, the requested intermediate file segments.

At block 918, the mobile client device displays one of the intermediate file segment byproducts on the touch screen. The mobile client device then monitors for swiping actions and, at block 920, when (if) a swiping action is detected, at block 922, the swiping action is decoded and the instruction performed. The mobile client device, at block 924, determines if more intermediate file segments are needed for preview, and if so, at block 914, the mobile client device sends a request for more blocks.

At block 903, the mobile client device determines whether or not to annotate or modify the displayed intermediate file segment. If instructions have been received to modify the displayed intermediate segment (e.g., via swiping actions or otherwise), then at block 932, the instructions are saved and, at block 934, the instructions are sent to the web-based or online collaboration platform.

Figure 10:
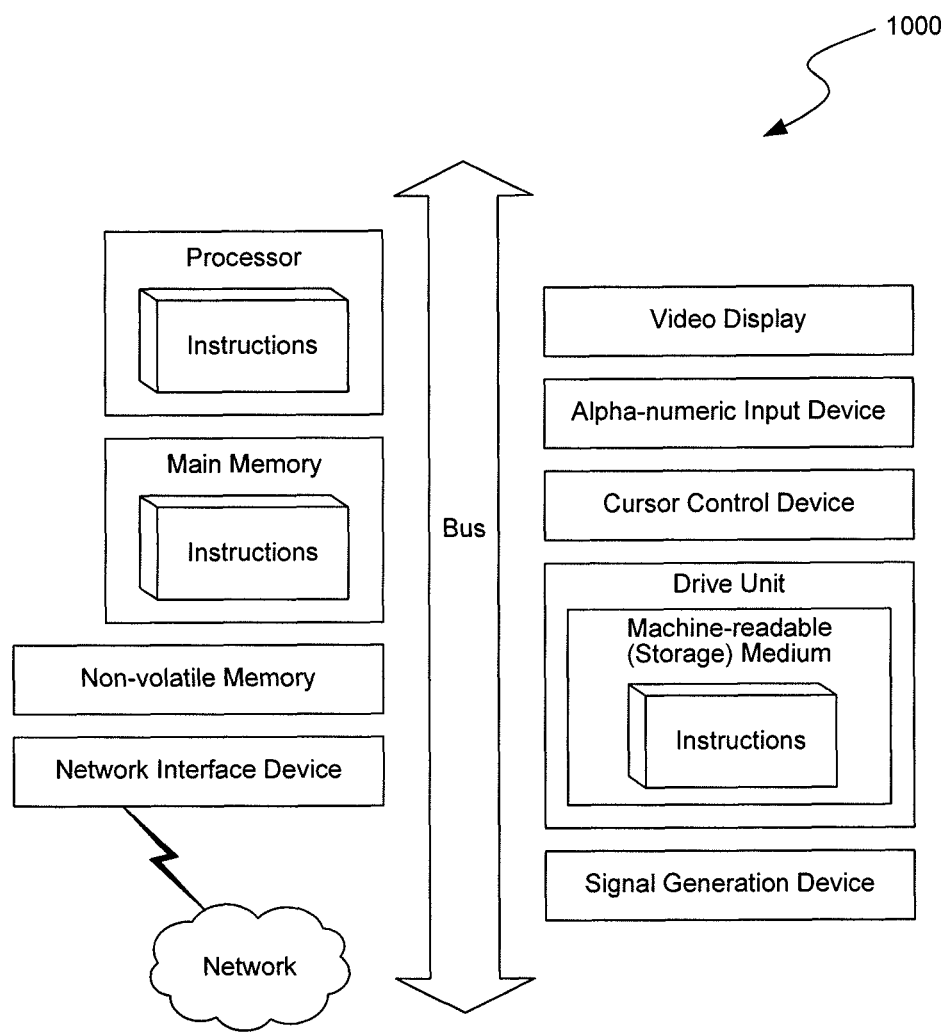
FIG. 10 depicts a diagrammatic representation of a machine in the example form of a computer system within which a set of instructions, for causing the machine to perform any one or more of the methodologies discussed herein, may be executed.

FIG. 10 shows a diagrammatic representation of a machine 1000 in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 900 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multi-layer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc., without deviating from the novel art of this disclosure.

Conclusion

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or subcombinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for.") Accordingly, the applicant reserves the right to add additional claims after filing the application to pursue such additional claim forms for other aspects of the invention.

We claim:

1. A method comprising:
   sending, from a mobile client device, a request to preview a file uploaded to a cloud-based collaboration platform, the uploaded file having a source format, the mobile client device having a touch screen interface;
   receiving, at the mobile client device, preview information for accessing and manipulating a preview of the uploaded file, the preview information including:

a scheme to access one or more intermediate file segments of the uploaded file:
  wherein the intermediate file segments are intermediate byproducts of a conversion of the file from the source format to a target format; and
  information identifying the source format of the file;
accessing the one or more file intermediate segments of the uploaded file using the scheme; and
displaying, at the mobile client device, the accessed file segments on a touch screen of the mobile client device, the displayed segments being responsive to swiping actions determined based on the source format;
identifying a swiping action at the touch screen interface of the mobile client device;
interpreting the swiping action at the mobile client device to identify an instruction based on the received information identifying the source format; and
performing, at the mobile client device, the instruction.

2. The method of claim 1, wherein the instruction comprises a request for one or more additional segments to be displayed on the mobile client device.

3. The method of claim 1, wherein the instruction comprises a request to annotate one or more sections of the displayed segment.

4. The method of claim 1, wherein the instruction comprises a request to adjust the displayed segment on the touch screen of the mobile client device.

5. The method of claim 1 further comprising:
receiving, at the mobile client device, notification that the file was uploaded to the web-based collaboration platform prior to sending the request to preview the uploaded file.

6. The method of claim 1, wherein the request to preview the file includes the requested preview format.

7. The method of claim 1, wherein the scheme to access the one or more file segments of the uploaded file includes one or more uniform resource locators.

8. The method of claim 1, wherein the preview information comprises meta data.

9. A system, comprising:
a wireless communication interface configured to send a request to preview a file uploaded to a cloud-based collaboration platform, the uploaded file having a source format, and receive preview information for accessing and manipulating a preview of the uploaded file, the preview information including:
  a scheme to access one or more intermediate file segments of the uploaded file,
  wherein the intermediate file segments are intermediate byproducts of a conversion of the file from the source format to a target format;
  information identifying the source format of the file; and
a viewer configured to:
  access the one or more file segments of the uploaded file using the scheme;
  display the accessed file segments on a touch screen, wherein the displayed segments are responsive to swiping actions on the touch screen determined based on the source format;
  identify a swiping action at the touch screen of the mobile client device;
  interpret the swiping action to identify an instruction based on the received information, and
  perform the instruction.

10. The system of claim 9, wherein the instruction comprises a modification to the displayed file segment.

11. The system of claim 10, wherein the wireless communication interface is further configured to send the modified file segment to the web-based collaboration platform.

12. The system of claim 9, the wireless communication interface further configured to receive a notification that the file was uploaded to the web-based collaboration platform prior to sending the request to preview the uploaded file.

13. The system of claim 9, the viewer further configured to modify the segments displayed on the touch screen and the wireless communication interface further configured to send the modified segments to the web-based collaboration platform.

14. A method for providing access to a preview of a file uploaded to a cloud-based collaboration environment, the file having a source format, the method comprising:
in response to a conversion event, converting, at a server, the file from the source format to a target format, the conversion resulting in a plurality of intermediate file segment byproducts having an intermediate format;
receiving, at the server, a request from a mobile client device to preview the file;
identifying, at the server, the type of the mobile client device requesting the preview;
in response to receiving the request, generating, at the server, preview information for accessing the preview of the file from the mobile client device, the preview information including:
  a scheme to access one or more intermediate file segments of the uploaded file, the scheme based on the identified type of mobile client device; and
  information identifying the source format of the file;
selecting, at the server, one or more of the intermediate file segments based on the intermediate file format and type of the mobile client device; and
providing the preview information and the one or more of the intermediate file segments to the mobile client device for display on a touch screen of the mobile client device;
wherein the preview information enables identification of a swiping action at a touch screen of the mobile client device, interpretation of the swiping actions to identify an instruction based on the source format and the type of mobile client device, and performance at the mobile client device, of the instruction.

15. The method of claim 14, further comprising:
prior to providing the intermediate file segments to the mobile client device, altering the intermediate format of one or more of the intermediate file segments based on a type of the mobile client device.

16. The method of claim 15, wherein altering the intermediate format of the one or more of the intermediate file segments comprises converting the one or more of the intermediate file segments to a requested preview format.

17. The method of claim 16, wherein the request to preview the file includes the requested preview format.

18. The method of claim 14, wherein the preview information provides the mobile client device with a uniform resource locator (URL) to access each of the intermediate file segments.

19. The method of claim 14, wherein the preview information provides a scheme to alter the one or more of the intermediate file segments at the mobile client device.

20. The method of claim 14, wherein the preview information comprises a total number of the intermediate file segments.

21. The method of claim 14, wherein the conversion event comprises an indication that the file has been uploaded to the web-based collaboration platform.

22. The method of claim 14, wherein the conversion event comprises an indication of a first preview of the file.

23. The method of claim 14, wherein the conversion event comprises an indication of a pattern of previously downloaded files.

24. The method of claim 14, wherein the mobile client device can commence preview prior to receiving all of the intermediate file segments associated with the file.

25. A non-transient computer readable medium comprising a set of instructions for causing a computer to perform the steps of:
   sending, from a mobile client device, a request to preview a file uploaded to a cloud-based collaboration platform, the uploaded file having a source format, the mobile client device having a touch screen interface;
   receiving, at the mobile client device, preview information for accessing and manipulating a preview of the uploaded file, the preview information including:
      a scheme to access one or more intermediate file segments of the uploaded file;
      wherein the intermediate file segments are intermediate byproducts of a conversion of the file from the source format to a target format; and
      information identifying the source format of the file;
   accessing the one or more file intermediate segments of the uploaded file using the scheme; and
   displaying, at the mobile client device, the accessed file segments on a touch screen of the mobile client device, the displayed segments being responsive to swiping actions determined based on the source format;
   identifying a swiping action at the touch screen interface of the mobile client device;
   interpreting the swiping action at the mobile client device to identify a particular instruction based on the received information identifying the source format; and
   performing, at the mobile client device, the particular instruction.

26. The non-transient computer readable medium of claim 25 wherein the particular instruction comprises a request to adjust the displayed segment on the touch screen of the mobile client device.

* * * * *